United States Patent
Katayama et al.

(10) Patent No.: US 11,987,723 B2
(45) Date of Patent: May 21, 2024

(54) FLUORINATED COATING AGENT COMPOSITION, SURFACE TREATMENT AGENT, AND ARTICLE

(71) Applicant: SHIN-ETSU CHEMICAL CO., LTD., Tokyo (JP)

(72) Inventors: Lisa Katayama, Annaka (JP); Yuji Yamane, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 923 days.

(21) Appl. No.: 16/980,089

(22) PCT Filed: Feb. 18, 2019

(86) PCT No.: PCT/JP2019/005845
§ 371 (c)(1),
(2) Date: Sep. 11, 2020

(87) PCT Pub. No.: WO2019/176458
PCT Pub. Date: Sep. 19, 2019

(65) Prior Publication Data

US 2021/0024776 A1  Jan. 28, 2021

(30) Foreign Application Priority Data

Mar. 14, 2018 (JP) .................. 2018-046592

(51) Int. Cl.
| | |
|---|---|
| *C09D 183/08* | (2006.01) |
| *C08G 65/336* | (2006.01) |
| *C08G 77/16* | (2006.01) |
| *C08G 77/20* | (2006.01) |
| *C08G 77/385* | (2006.01) |
| *C08G 77/62* | (2006.01) |
| *C09D 171/02* | (2006.01) |
| *C09D 183/12* | (2006.01) |
| *C09D 183/16* | (2006.01) |

(52) U.S. Cl.
CPC ......... *C09D 183/08* (2013.01); *C08G 65/336* (2013.01); *C08G 77/16* (2013.01); *C08G 77/20* (2013.01); *C08G 77/385* (2013.01); *C08G 77/62* (2013.01); *C09D 171/02* (2013.01); *C09D 183/12* (2013.01); *C09D 183/16* (2013.01)

(58) Field of Classification Search
CPC ...... C09D 183/16; C08L 83/16; C09J 183/16; C08G 77/62
See application file for complete search history.

(56) References Cited

U.S. PATENT DOCUMENTS

| | | | | |
|---|---|---|---|---|
| 6,183,872 B1 * | 2/2001 | Tanaka | ................. | C08G 65/336 |
| | | | | 528/42 |
| 9,644,115 B2 * | 5/2017 | Yamane | ................ | C09D 183/14 |
| 9,771,384 B2 * | 9/2017 | Yamane | ................ | C07F 7/0838 |
| 9,790,322 B2 * | 10/2017 | Sakoh | ................... | C09D 171/02 |
| 9,850,399 B2 * | 12/2017 | Yamane | ................ | C08G 65/336 |
| 10,097,773 B2 * | 10/2018 | Lin | ........................ | H04N 23/71 |
| 11,053,410 B2 * | 7/2021 | Yamane | ................ | C09D 171/00 |
| 2002/0105728 A1 | 8/2002 | Yamaguchi et al. | | |
| 2009/0208728 A1 | 8/2009 | Itami et al. | | |
| 2009/0216035 A1 | 8/2009 | Itami et al. | | |
| 2010/0015453 A1 | 1/2010 | Yamaguchi et al. | | |
| 2010/0331487 A1 | 12/2010 | Yang et al. | | |
| 2010/0331498 A1 * | 12/2010 | Yang | ....................... | C08L 83/16 |
| | | | | 525/474 |
| 2012/0077041 A1 | 3/2012 | Yamane et al. | | |
| 2013/0136928 A1 | 5/2013 | Yamane et al. | | |
| 2013/0303689 A1 | 11/2013 | Sato et al. | | |
| 2014/0147680 A1 | 5/2014 | Yamane et al. | | |
| 2014/0323630 A1 | 10/2014 | Kobori | | |

FOREIGN PATENT DOCUMENTS

| | | | |
|---|---|---|---|
| JP | 2-127477 A | 5/1990 | |
| JP | 2860979 B2 | 2/1999 | |
| JP | 11-227109 A | 8/1999 | |
| JP | 2003-238577 A | 8/2003 | |
| JP | 2004-145283 A | 5/2004 | |
| JP | 3722418 B2 | 11/2005 | |
| JP | 2006-219538 A | 8/2006 | |
| JP | 2008-144144 A | 6/2008 | |
| JP | 2008-534696 A | 8/2008 | |
| JP | 2008-537557 A | 9/2008 | |
| JP | 2010-43251 A | 2/2010 | |
| JP | 4672095 B2 | 4/2011 | |

(Continued)

OTHER PUBLICATIONS

Machine translation of JP 2013-241569 (No. date).*

(Continued)

*Primary Examiner* — Marc S Zimmer
(74) *Attorney, Agent, or Firm* — Birch, Stewart, Kolasch & Birch, LLP

(57) ABSTRACT

This surface treatment agent can form a water repellent/oil repellent layer having particularly excellent wear durability, weather resistance, and alkali resistance, and contains a fluorinated coating agent composition containing: (A) one or more selected from hydroxy group- or hydrolyzable group-containing silanes and siloxanes modified with a fluorooxyalkylene group-containing polymer, and partial (hydrolyzed) condensates thereof, and (B) a fluorooxyalkylene group-containing polymer-modified polysilazane formed of silazane units modified with a fluorooxyalkylene group-containing polymer, wherein the number-average molecular weight of fluorooxyalkylene group-containing polymer residues in the component (A) is 1,500-10,000, the number-average molecular weight of fluorooxyalkylene group-containing polymer residues in the silazane units modified with the fluorooxyalkylene group-containing polymer in the component (B) is 500-6,000, and the mixed mass ratio between the component (A) and the component (B) is 10:90 to 90:10.

14 Claims, No Drawings

(56) References Cited

FOREIGN PATENT DOCUMENTS

| | | |
|---|---|---|
| JP | 2012-72272 A | 4/2012 |
| JP | 2012-157856 A | 8/2012 |
| JP | 2012-532207 A | 12/2012 |
| JP | 2013-136833 A | 7/2013 |
| JP | 2014-105235 A | 6/2014 |
| JP | 2014-213317 A | 11/2014 |
| JP | 2015-137284 A | 7/2015 |
| TW | 201734107 A | 10/2017 |
| WO | WO 2017/077834 A1 | 5/2017 |
| WO | WO 2018/021539 A1 | 2/2018 |

OTHER PUBLICATIONS

International Search Report, issued in PCT/JP2019/005845, PCT/ISA/210, dated May 7, 2019.
Written Opinion of the International Searching Authority, issued in PCT/JP2019/005845, PCT/ISA/237, dated May 7, 2019.
Office Action dated Sep. 5, 2022, in Taiwan Patent Application No. 108106984.

* cited by examiner

FLUORINATED COATING AGENT COMPOSITION, SURFACE TREATMENT AGENT, AND ARTICLE

TECHNICAL FIELD

This invention relates to a fluorinated coating composition, and more particularly, to a fluorinated coating composition capable of forming a coating having excellent water/oil repellency, abrasion resistance, and weather resistance, a surface treating agent comprising the composition, and an article which is surface-treated with the surface treating agent.

BACKGROUND ART

Of conventional surface treating agents, many agents exhibit excellent water/oil repellency to glass, but few agents exhibit a good balance of such properties as abrasion resistance, weather resistance and alkali resistance.

In general, fluoropolyether group-containing compounds have water/oil repellency, chemical resistance, lubricity, parting and antifouling properties because of their very low surface free energy. For advantageous use of these properties, the compounds are widely used in the industry, for example, as water/oil repellent antifouling agents for paper and textiles, lubricants for magnetic recording media, oil-proof agents for precision machines, parting agents, cosmetics and protective films. The same properties, however, suggest non-sticky and non-adhesive properties to other substrates at the same time. Coating to substrate surface is possible, but tight adhesion of coatings is difficult.

On the other hand, silane coupling agents are well known for coupling organic compounds to the surface of glass and fabric substrates. They are widely used as surface coating agents for numerous substrates. The silane coupling agent contains an organic functional group and a reactive silyl group (typically hydrolyzable silyl such as alkoxysilyl) in the molecule. In the presence of airborne moisture or the like, the hydrolyzable silyl groups undergo self-condensation reaction to form a coating. Since the hydrolyzable silyl groups form chemical and physical bonds with the surface of glass or metal, the coating becomes a tough coating having durability.

Patent Documents 1 to 8 (JP-A 2003-238577, JP 2860979, JP 4672095, JP-A 2008-534696, JP-A 2008-537557, JP-A 2012-072272, JP-A 2012-157856, JP-A 2013-136833) disclose compositions comprising a fluoropolyether-containing polymer-modified silane which is obtained by introducing a hydrolyzable silyl group into a fluoropolyether-containing compound, the compositions being able to form a coating tightly bonding to the substrate surface and having water/oil repellency, chemical resistance, lubricity, parting, antifouling and other properties on the substrate surface.

For the surface treatment of substrates with a composition comprising the fluoropolyether-containing polymer-modified silane, various coating methods are used to form coatings on the substrates. The coating step is followed by the step of curing the coating through hydrolysis of hydrolyzable silyl groups, where hydrolytic reaction is promoted under high temperature conditions, e.g., 80° C. or 120° C. or humid conditions. A cured coating can also be formed even at room temperature through slow reaction with airborne moisture. However, the curing step can become the rate-determining step (retarding factor) in the production process in that the step requires hot humid conditions or takes a time in the case of curing at room temperature. In addition, coatings (or water/oil repellent layers) obtained from curing under mild conditions for a short time, typically curing at room temperature have problems including poor abrasion resistance and degradation of antifouling performance during service.

In Patent Document 9 (JP-A 2008-144144), a fluorinated carboxylic acid is added as a curing catalyst to a coating composition to promote curing, enabling to form a film under mild conditions within a short time. However, abrasion resistance becomes poor as the catalyst amount is reduced, whereas the initial performance is degraded as the catalyst amount is increased. There is a strong possibility that the carboxyl groups or polar groups emerge on the outermost surface of a coating, with a loss of performance.

It is also known to add a catalyst to promote hydrolytic reaction of alkoxysilyl groups. Catalysts known so far include organic titanates such as tetrabutyl titanate and tetraisopropyl titanate; organic titanium chelate compounds such as diisopropoxybis(ethylacetoacetate)titanium; organic aluminum compounds such as aluminum tris(acetylacetonate) and aluminum tris(ethylacetoacetate); organic zirconium compounds such as zirconium tetra(acetylacetonate) and zirconium tetrabutyrate; organic tin compounds such as dibutyltin dioctoate, dibutyltin dilaurate, dibutyltin di(2-ethylhexanoate), dioctyltin dilaurate, dioctyltin diacetate, and dioctyltin dioctoate; metal salts of organic carboxylic acids such as tin naphthenate, tin oleate, tin butyrate, cobalt naphthenate, and zinc stearate; amine compounds and salts thereof such as hexylamine and dodecylamine phosphate; quaternary ammonium salts such as bezyltriethylammonium acetate; alkali metal salts of lower fatty acids such as potassium acetate and lithium nitrate; dialkylhydroxylamines such as dimethylhydroxylamine and diethylhydroxylamine; guanidyl-containing organosilicon compounds such as tetramethylguanidylpropyltrimethoxysilane; organic acids such as acetic acid and methanesulfonic acid; and mineral acids such as hydrochloric acid and sulfuric acid. However, these catalysts suffer from poor catalytic efficiency because they are insoluble or little soluble, if so, in fluorochemical solvents. Also, metal values are left behind, which can degrade the properties of the cured film.

Patent Document 10 (JP-A 2004-145283) proposes a fluoropolyalkylene ether group-containing silane. A lens treated with the fluoropolyalkylene ether group-containing silane exhibits good oil repellency and fingerprint wipe-off, but insufficient abrasion resistance.

Various coating compositions have been studied as the antifouling surface treating agent. For example, Patent Document 11 (JP 3722418) and Patent Document 12 (JP-A 2010-043251) disclose surface treating compositions comprising perfluoropolyether-modified silazanes. The compositions of these Patent Documents are insufficient in abrasion durability.

PRIOR ART DOCUMENTS

Patent Documents

Patent Document 1: JP-A 2003-238577
Patent Document 2: JP 2860979
Patent Document 3: JP 4672095
Patent Document 4: JP-A 2008-534696
Patent Document 5: JP-A 2008-537557
Patent Document 6: JP-A 2012-072272
Patent Document 7: JP-A 2012-157856
Patent Document 8: JP-A 2013-136833
Patent Document 9: JP-A 2008-144144

Patent Document 10: JP-A 2004-145283
Patent Document 11: JP 3722418
Patent Document 12: JP-A 2010-043251

SUMMARY OF INVENTION

Technical Problem

An object of the invention, which has been made under the above-mentioned circumstances, is to provide a fluorinated coating composition capable of forming a water/oil repellent layer having excellent abrasion resistance, weather resistance, and alkali resistance, a surface treating agent comprising the composition, and an article which is surface-treated with the surface treating agent.

Solution to Problem

Making extensive investigations to attain the above object, the inventors have found that a fluorinated coating composition is obtainable by mixing one or more compounds selected from hydroxyl or hydrolyzable group-containing silanes and siloxanes which are modified with a fluorooxyalkylene-containing polymer, and partial (hydrolytic) condensates thereof, the fluorooxyalkylene-containing polymer residue therein having a number average molecular weight in a specific range, preferably fluorooxyalkylene-containing polymer-modified, hydroxyl or hydrolyzable group-containing silanes and siloxanes, represented by the general formula (1) or (2) below, and partial (hydrolytic) condensates thereof, with a fluorooxyalkylene-containing polymer-modified polysilazane composed of fluorooxyalkylene-containing polymer-modified silazane units, the fluorooxyalkylene-containing polymer residue therein having a number average molecular weight in a specific range, in a specific ratio; wherein preferably the number average molecular weight of the fluorooxyalkylene-containing polymer residue in the fluorooxyalkylene-containing polymer-modified, hydroxyl or hydrolyzable group-containing silanes and siloxanes is greater than the number average molecular weight of the fluorooxyalkylene-containing polymer residue in the fluorooxyalkylene-containing polymer-modified silazane unit in the fluorooxyalkylene-containing polymer-modified polysilazane; and that a surface treating agent comprising the fluorinated coating composition can form a water/oil repellent layer having excellent abrasion resistance, weather resistance, and alkali resistance.

Accordingly, the invention provides a fluorinated coating composition, a surface treating agent comprising the composition, and an article which is surface-treated with the surface treating agent, as defined below.

1.
A fluorinated coating composition comprising (A) one or more compounds selected from hydroxyl or hydrolyzable group-containing silanes and siloxanes which are modified with a fluorooxyalkylene-containing polymer, and partial (hydrolytic) condensates thereof, the fluorooxyalkylene-containing polymer residue in component (A) having a number average molecular weight of 1,500 to 10,000, and (B) a fluorooxyalkylene-containing polymer-modified polysilazane composed of fluorooxyalkylene-containing polymer-modified silazane units, the fluorooxyalkylene-containing polymer residue in the fluorooxyalkylene-containing polymer-modified silazane units as component (B) having a number average molecular weight of 500 to 6,000, wherein component (A) and component (B) are mixed in a weight ratio of from 10:90 to 90:10, provided that the total weight of components (A) and (B) is 100.

2.
The fluorinated coating composition of 1 wherein component (A) is one or more compounds selected from fluorooxyalkylene-containing polymer-modified, hydroxyl or hydrolyzable group-containing silanes and siloxanes, represented by the general formula (1) or (2), and partial (hydrolytic) condensates thereof,

Rf-[A(V)$_\beta$]$_\alpha$   (1)

wherein Rf is a mono- or divalent fluorooxyalkylene-containing polymer residue, A is independently a di- to decavalent organic group which may contain an oxygen, silicon or nitrogen atom and which may be fluorinated, V is independently a monovalent group containing a silyl group terminated with a hydroxyl or hydrolyzable group, $\alpha$ is 1 or 2, $\beta$ is an integer of 1 to 9,

Rf-[Q-(G)$_\delta$-B]$_\alpha$   (2)

wherein Rf and $\alpha$ are as defined above, Q is independently a single bond or a divalent organic group which may contain an oxygen, silicon or nitrogen atom, G is independently a divalent organic group which contains a silyl group having a hydroxyl or hydrolyzable group and may contain an oxygen atom, B is independently hydrogen, $C_1$-$C_4$ alkyl group or halogen, $\delta$ is an integer of 1 to 10, and component (B) is a fluorooxyalkylene-containing polymer-modified polysilazane composed of fluorooxyalkylene-containing polymer-modified silazane units, represented by the general formula (3):

Rf-[A'-Si(NH)$_{1.5}$]$_\alpha$   (3)

wherein Rf and $\alpha$ are as defined above, A' is independently a divalent organic group which may contain an oxygen, silicon or nitrogen atom and which may be fluorinated.

3.
The fluorinated coating composition of 1 or 2 wherein component (A) is one or more compounds selected from fluorooxyalkylene-containing polymer-modified, hydroxyl or hydrolyzable group-containing silanes and siloxanes, represented by the general formula (4) or (5), and partial (hydrolytic) condensates thereof,

[Chem. 1]

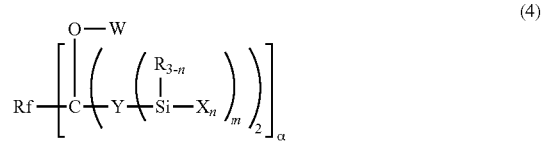

(4)

wherein Rf is a mono- or divalent fluorooxyalkylene-containing polymer residue, Y is independently a di- to hexavalent organic group which may contain one or more moieties selected from silicon, siloxane bond, silalkylene structure and silarylene structure, R is independently a $C_1$-$C_4$ alkyl group or phenyl group, X is independently a hydroxyl or hydrolizable group, n is an integer of 1 to 3, m is an integer of 1 to 5, W is independently hydrogen or a group having the formula (4a) or (4b):

[Chem. 2]

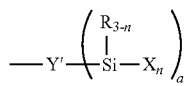
(4a)

wherein R, X and n are as defined above, Y' is a di- to hexavalent organic group which may contain silicon and/or siloxane bond, a is an integer of 1 to 5,

[Chem. 3]

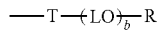
(4b)

wherein R is as defined above, T is a single bond, divalent siloxane bond or silylene group, L is independently a $C_1$-$C_4$ alkylene group, and b is an integer of 1 to 20, α is 1 or 2,

[Chem. 4]

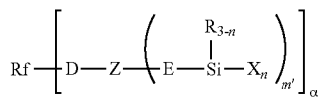
(5)

wherein Rf, X, R, n and α are as defined above, D is independently a single bond or a divalent organic group which may contain ether bond and/or silicon and which may be fluorinated, Z is independently a single bond, or a group selected from trivalent group of the formula: —C(J)= (wherein J is an alkyl group, hydroxyl group or silyl ether group of the formula: $K_3SiO$— wherein K is independently hydrogen, alkyl, aryl or alkoxy), trivalent group of the formula: —Si(L')= (wherein L' is alkyl), tetravalent group of the formula: —C≡, tetravalent group of the formula: —Si≡, and di- to octavalent siloxane residues, E is independently a $C_1$-$C_5$ alkylene group which may contain one or more moieties selected from oxygen, diorganosilylene group and diorganosiloxane structure, and m' is an integer of 1 to 7.

4. The fluorinated coating composition of 2 or 3 wherein in formulae (1) to (5), α=1, and Rf is a monovalent fluorooxyalkylene-containing polymer residue having the general formula (6):

[Chem. 5]

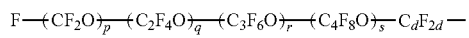
(6)

wherein p, q, r and s each are an integer of 0 to 200, p+q+r+s is 3 to 200, each of the repeating units may be linear or branched, the repeating units may be randomly arranged, d is an integer of 1 to 3, the unit with d may be linear or branched.

5. The fluorinated coating composition of 4 wherein in formulae (1) to (5), α=1, and Rf is a monovalent fluorooxyalkylene-containing polymer residue having the general formula (7a) or (7b):

[Chem. 6]

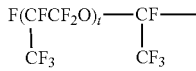
(7a)

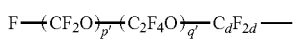
(7b)

wherein t is an integer of at least 3, p' and q' each are an integer of 1 to 199, p'+q' is 3 to 200, each of the repeating units may be linear or branched, the repeating units may be randomly arranged, d is an integer of 1 to 3, the unit with d may be linear or branched.

6. The fluorinated coating composition of 2 or 3 wherein in formulae (1) to (5), α=2, and Rf is a divalent fluorooxyalkylene-containing polymer residue having the general formula (8):

[Chem. 7]

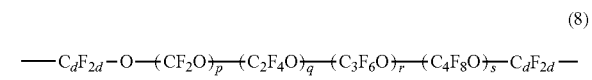
(8)

wherein p, q, r and s each are an integer of 0 to 200, p+q+r+s is 3 to 200, each of the repeating units may be linear or branched, the repeating units may be randomly arranged, d is an integer of 1 to 3, the unit with d may be linear or branched.

7. The fluorinated coating composition of 6 wherein in formulae (1) to (5), α=2, and Rf is a divalent fluorooxyalkylene-containing polymer residue having the general formula (9a) or (9b):

[Chem. 8]

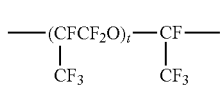
(9a)

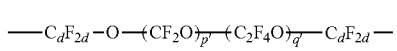
(9b)

wherein t is an integer of at least 3, p' and q' each are an integer of 1 to 199, p'+q' is 3 to 200, each of the repeating units may be linear or branched, the repeating units may be randomly arranged, d is an integer of 1 to 3, the unit with d may be linear or branched.

8. The fluorinated coating composition of any one of 1 to 7 wherein the number average molecular weight of the fluorooxyalkylene-containing polymer residue in component (A) is greater than the number average molecular weight of the fluorooxyalkylene-containing polymer residue in the fluorooxyalkylene-containing polymer-modified silazane unit as component (B).

9. The fluorinated coating composition of any one of 3 to 8 wherein in formula (4), Y is a group selected from a $C_3$-$C_{10}$ alkylene group, a $C_6$-$C_8$ arylene-containing alkylene group, a divalent group having alkylene groups bonded via a silalkylene or silarylene structure, and a di- to tetravalent group having a $C_2$-$C_{10}$ alkylene group bonded to a valence bond of a di- to tetravalent linear organopolysiloxane residue of 2 to 10 silicon atoms or di- to tetravalent branched or cyclic organopolysiloxane residue of 3 to 10 silicon atoms.

10.
The fluorinated coating composition of any one of 3 to 9 wherein in formula (4a), Y' is a group selected from a $C_2$-$C_{10}$ alkylene group, a $C_6$-$C_8$ arylene-containing alkylene group, a $C_2$-$C_6$ diorganosilylene-containing alkylene group, a divalent group having alkylene groups bonded via a silalkylene or silarylene structure, and a di- to tetravalent group having a $C_2$-$C_{10}$ alkylene group bonded to a valence bond of a di- to tetravalent linear organopolysiloxane residue of 2 to 10 silicon atoms or di- to tetravalent branched or cyclic organopolysiloxane residue of 3 to 10 silicon atoms.

11.
The fluorinated coating composition of any one of 3 to 10 wherein in formulae (4), (4a) and (5), each X is selected from a hydroxyl group, $C_1$-$C_{10}$ alkoxy group, $C_2$-$C_{10}$ alkoxyalkoxy group, $C_1$-$C_{10}$ acyloxy group, $C_2$-$C_{10}$ alkenyloxy group, and halogen.

12.
A surface treating agent comprising the fluorinated coating composition of any one of 1 to 11.

13.
A cured film comprising the surface treating agent of 12 in the cured state.

14.
An article having on its surface the cured film of the surface treating agent of 13.

Advantageous Effects of Invention

The fluorinated coating composition of the invention is obtained by mixing a hydroxyl or hydrolyzable group-containing, fluoropolyether group-containing polymer, the fluorooxyalkylene-containing polymer residue therein having a number average molecular weight in a specific range, with a fluorooxyalkylene-containing polymer-modified polysilazane composed of fluorooxyalkylene-containing polymer-modified silazane units, the fluorooxyalkylene-containing polymer residue therein having a number average molecular weight in a specific range, in a specific ratio. Since the hydroxyl or hydrolyzable group site serves to form a tight bond to a substrate and the silazane group-containing polymer has weather resistance, an article which is surface-treated with a surface treating agent comprising the fluorinated coating composition containing said polymer and/or partial (hydrolytic) condensate thereof exhibits excellent water/oil repellency as well as satisfactory abrasion resistance, weather resistance, and alkali resistance.

DESCRIPTION OF EMBODIMENTS

The invention provides a fluorinated coating composition comprising (A) one or more compounds selected from fluorooxyalkylene-containing polymer-modified, hydroxyl or hydrolyzable group-containing silanes and siloxanes, and partial (hydrolytic) condensates thereof, the fluorooxyalkylene-containing polymer residue in component (A) having a number average molecular weight of 1,500 to 10,000, and (B) a fluorooxyalkylene-containing polymer-modified polysilazane composed of fluorooxyalkylene-containing polymer-modified silazane units, the fluorooxyalkylene-containing polymer residue in the fluorooxyalkylene-containing polymer-modified silazane units as component (B) having a number average molecular weight of 500 to 6,000, wherein component (A) and component (B) are mixed in a weight ratio (A:B) of from 10:90 to 90:10, provided that the total weight of components (A) and (B) is 100. In a preferred embodiment, components (A) and (B) are mixed in a weight ratio (A:B) of from 15:85 to 90:10, more preferably from 30:70 to 85:15, even more preferably from 40:60 to 80:20, provided that the total weight of components (A) and (B) is 100. In connection with the mixing ratio, if component (A) is too much or if component (B) is too less, no satisfactory weather resistance is obtainable, and if component (A) is too less or if component (B) is too much, no satisfactory abrasion durability is obtainable. Then a fluorinated coating composition having a mixing weight ratio outside the range fails to meet both abrasion durability and weather resistance.

The fluorooxyalkylene-containing polymer residue (i.e., perfluoropolyether chain) in component (A) has a number average molecular weight (Mn) of 1,500 to 10,000, preferably 1,500 to 8,000, more preferably 2,000 to 7,000. The fluorooxyalkylene-containing polymer residue (i.e., perfluoropolyether chain) in the fluorooxyalkylene-containing polymer-modified silazane units as component (B) has a Mn of 500 to 6,000, preferably 500 to 5,000, more preferably 700 to 4,000, even more preferably 700 to 1,500. If the Mn of the fluorooxyalkylene-containing polymer residue in component (A) is too low or too high, the resulting water/oil repellent (antifouling) cured film becomes degraded in abrasion resistance, weather resistance and/or alkali resistance. Similarly, if the Mn of the fluorooxyalkylene-containing polymer residue in the fluorooxyalkylene-containing polymer-modified silazane unit as component (B) is too low or too high, the resulting water/oil repellent (antifouling) cured film becomes degraded in abrasion resistance, weather resistance and/or alkali resistance.

Also in the invention, better abrasion durability and weather resistance are obtainable when the Mn of the perfluoropolyether chain (i.e., fluorooxyalkylene-containing polymer residue) in component (A) is greater than the Mn of the perfluoropolyether chain (i.e., fluorooxyalkylene-containing polymer residue) in the fluorooxyalkylene-containing polymer-modified silazane unit as component (B). When the Mn of the perfluoropolyether chain in component (A) is relatively low, or when the Mn of the perfluoropolyether chain in the fluorooxyalkylene-containing polymer-modified silazane unit as component (B) is relatively high, sometimes the film may not exhibit water/oil repellency and low dynamic friction, failing to achieve abrasion durability. Component (B) contributes to weather resistance because its terminal silazane portion forms an intermolecular bond to a substrate. However, if its molecule is too long, the intermolecular bond weakens, with weather resistance being aggravated.

It is noted herein that the Mn of the perfluoropolyether chain can be measured by $^{19}$F-NMR spectroscopy.

The fluorinated coating composition of the invention is improved in substrate adhesion and becomes excellent in water/oil repellency as well as abrasion durability, weather resistance and alkali resistance as long as components (A) and (B) are mixed in the specific ratio.

Now the fluorinated coating composition of the invention is described in detail.

Component (A)

Component (A) is selected from hydroxyl or hydrolyzable group-containing silanes and siloxanes which are modified with a fluorooxyalkylene-containing polymer (i.e., mono- or divalent perfluoropolyether chain), and partial (hydrolytic) condensates thereof (i.e., organosiloxane oligomers obtained from partial (hydrolytic) condensation of hydroxyl or hydrolyzable group-containing silyl groups in the compound, and having at least 2, preferably at least 3 residual hydroxyl or hydrolyzable groups in the molecule), preferably from fluorooxyalkylene-containing polymer-modified, hydroxyl or hydrolyzable group-containing silanes and siloxanes, represented by the general formula (1) or (2), and partial (hydrolytic) condensates thereof.

$$\text{Rf-}[A(V)_\beta]_\alpha \quad (1)$$

Herein Rf is a mono- or divalent fluorooxyalkylene-containing polymer residue, A is independently a di- to decavalent organic group which may contain an oxygen, silicon or nitrogen atom and which may be fluorinated, V is independently a monovalent group containing a silyl group terminated with a hydroxyl or hydrolyzable group, $\alpha$ is 1 or 2, and $\beta$ is an integer of 1 to 9.

$$\text{Rf-}[Q\text{-}(G)_\delta\text{-}B]_\alpha \quad (2)$$

Herein Rf and $\alpha$ are as defined above, Q is independently a single bond or a divalent organic group which may contain an oxygen, silicon or nitrogen atom, G is independently a divalent organic group which contains a silyl group having a hydroxyl or hydrolyzable group and may contain oxygen, B is independently hydrogen, a $C_1$-$C_4$ alkyl group or halogen, and $\delta$ is an integer of 1 to 10.

More preferably, component (A) is selected from fluorooxyalkylene-containing polymer-modified, hydroxyl or hydrolyzable group-containing silanes and siloxanes represented by the general formula (4) or (5), and partial (hydrolytic) condensates thereof.

[Chem. 9]

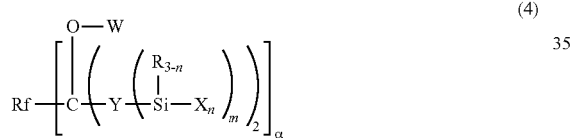

(4)

Herein Rf and $\alpha$ are as defined above, Y is independently a di- to hexavalent organic group which may contain one or more moieties selected from silicon, siloxane bond, silalkylene structure and silarylene structure, R is independently a $C_1$-$C_4$ alkyl group or phenyl group, X is independently a hydroxyl or hydrolizable group, n is an integer of 1 to 3, m is an integer of 1 to 5, W is independently hydrogen or a group having the formula (4a) or (4b):

[Chem. 10]

(4a)

wherein R, X and n are as defined above, Y' is a di- to hexavalent organic group which may contain silicon and/or siloxane bond, "a" is an integer of 1 to 5,

[Chem. 11]

(4b)

wherein R is as defined above, T is a single bond, divalent siloxane bond or silylene group, L is independently a $C_1$-$C_4$ alkylene group, and b is an integer of 1 to 20.

[Chem. 12]

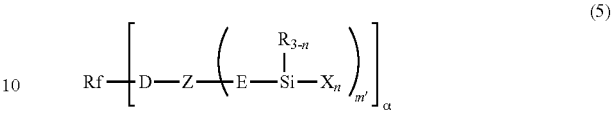

(5)

Herein Rf, X, R, n and $\alpha$ are as defined above, D is independently a single bond or divalent organic group which may contain ether bond and/or silicon and which may be fluorinated, Z is independently a single bond, or a group selected from trivalent group of the formula: —C(J)= (wherein J is an alkyl group, hydroxyl group or silyl ether group of the formula: $K_3SiO$— wherein K is independently hydrogen, alkyl, aryl or alkoxy), trivalent group of the formula: —Si(L')= (wherein L' is alkyl), tetravalent group of the formula: —C≡, tetravalent group of the formula: —Si≡, and di- to octavalent siloxane residues, E is independently a $C_1$-$C_5$ alkylene group which may contain one or more moieties selected from oxygen, diorganosilylene group and diorganosiloxane structure, and m' is an integer of 1 to 7.

In the above formulae (1), (2), (4) and (5), Rf is a mono- or divalent fluorooxyalkylene-containing polymer residue. In the case of $\alpha$=1, Rf is a monovalent fluorooxyalkylene-containing polymer residue, i.e., monovalent perfluoropolyether chain. Preferably, Rf is a monovalent fluorooxyalkylene-containing polymer residue having the general formula (6).

[Chem. 13]

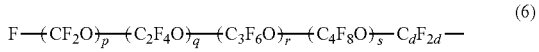

(6)

Herein p, q, r and s each are an integer of 0 to 200, p+q+r+s is 3 to 200, each of the repeating units may be linear or branched, the repeating units may be randomly arranged, d is an integer of 1 to 3, the unit with d may be linear or branched.

More preferably, Rf is a monovalent fluorooxyalkylene-containing polymer residue having the general formula (7a) or (7b).

[Chem. 14]

(7a)

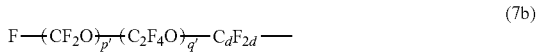

(7b)

Herein t is an integer of at least 3, p' and q' each are an integer of 1 to 199, p'+q' is 3 to 200, each of the repeating units may be linear or branched, the repeating units may be randomly arranged, d is as defined above.

In the case of $\alpha$=2 in formulae (1), (2), (4) and (5), Rf is a divalent fluorooxyalkylene-containing polymer residue, i.e., divalent perfluoropolyether chain. Preferably Rf is a divalent fluorooxyalkylene-containing polymer residue having the general formula (8).

[Chem. 15]

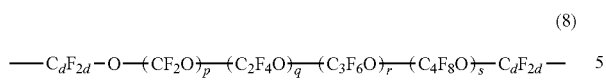

(8)

Herein p, q, r and s each are an integer of 0 to 200, p+q+r+s is 3 to 200, each of the repeating units may be linear or branched, the repeating units may be randomly arranged, d is an integer of 1 to 3, the unit with d may be linear or branched.

More preferably, Rf is a divalent fluorooxyalkylene-containing polymer residue having the general formula (9a) or (9b).

[Chem. 16]

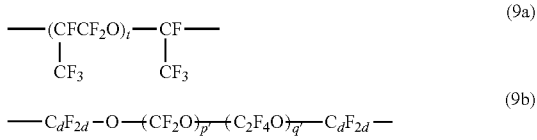

Herein t is an integer of at least 3, p' and q' each are an integer of 1 to 199, p'+q' is 3 to 200, each of the repeating units may be linear or branched, the repeating units may be randomly arranged, d is as defined above.

In formulae (6) and (8), p, q, r and s each are an integer of 0 to 200; preferably, p is an integer of 5 to 100, q is an integer of 5 to 100, r is an integer of 0 to 100, and s is an integer of 0 to 100; p+q+r+s is an integer of 3 to 200, preferably 10 to 105, more preferably 10 to 100. Each of the repeating units may be linear or branched, and the repeating units may be randomly arranged. More preferably, p+q is an integer of 10 to 105, especially 15 to 60, and r=s=0. A p+q+r+s value of less than the upper limit ensures good adhesion and curability whereas a p+q+r+s value of more than the lower limit allows the fluoropolyether group to develop its characteristics.

In formulae (7a) and (9a), t is an integer of at least 3, preferably an integer of 3 to 50, more preferably 3 to 40.

In formulae (7b) and (9b), p' and q' each are an integer of 1 to 199, preferably an integer of 5 to 100, and p'+q' is an integer of 3 to 200, preferably 10 to 105. Each of the repeating units may be linear or branched, and the repeating units may be randomly arranged.

Examples of the mono- or divalent group Rf are shown below.

[Chem. 17]

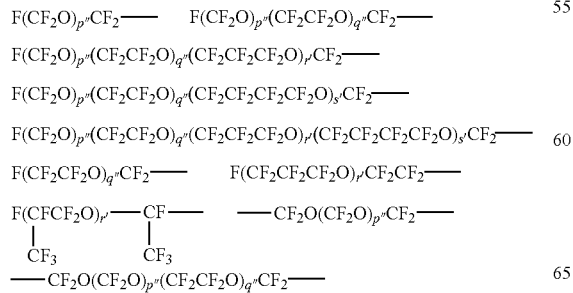

-continued

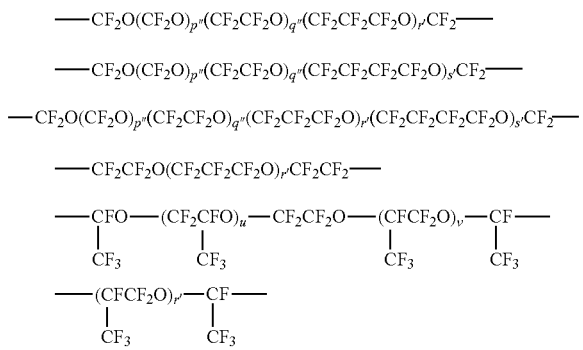

Herein p", q", r' and s' each are an integer of 1 to 199, the sum of p", q", r' and s' is 3 to 200, u is an integer of 1 to 24, and v is an integer of 1 to 24. The repeating units may be randomly arranged.

In formulae (1), (2), (4) and (5), α is 1 or 2.

In formula (1), A is independently a di- to decavalent, preferably di- to octavalent, more preferably di- to heptavalent organic group (e.g., substituted or unsubstituted alkylene, arylene or alkylene-arylene group) which may contain an oxygen atom (e.g., ether bond or (poly)oxyalkylene structure), silicon atom (e.g., diorganosilylene, triorganosilyl, triorganosiloxy, linear, branched or cyclic organo(poly)siloxane structure), or nitrogen atom (e.g., amino group, imino group, or amide bond), and which may be fluorinated, preferably a di- to decavalent, preferably di- to octavalent, more preferably di- to heptavalent hydrocarbon group which may contain oxygen, silicon or nitrogen and which may be fluorinated, that is, a group for linking a fluorooxyalkylene-containing polymer residue to a hydroxyl and/or hydrolyzable group-containing silyl group.

Examples of the group A are shown below.

[Chem. 18]

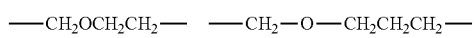

[Chem. 19]

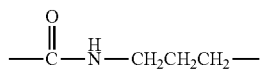

[Chem. 20]

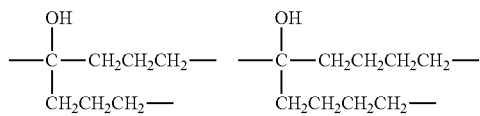

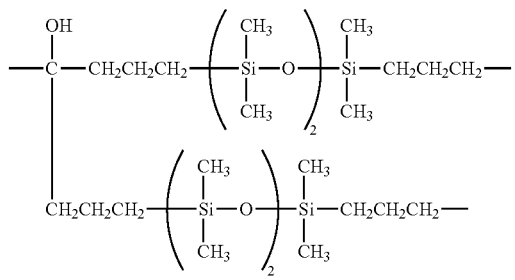

-continued
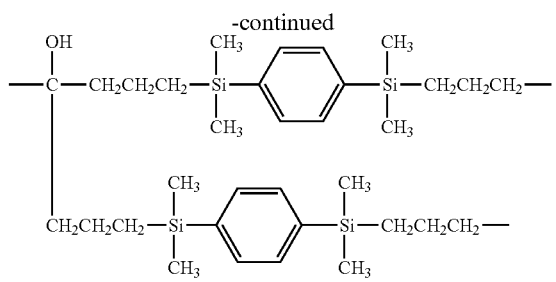
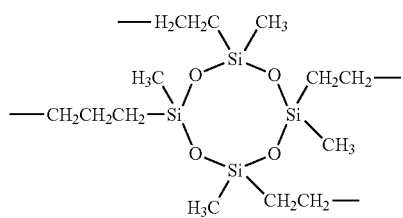
[Chem. 21]
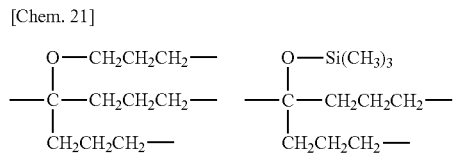
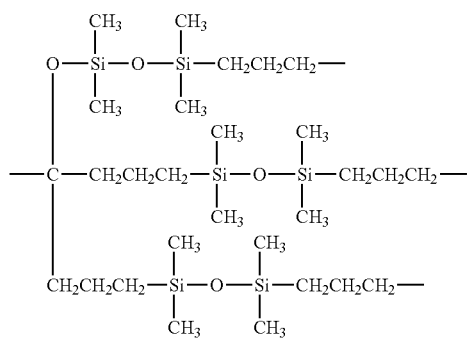
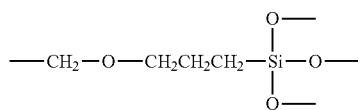
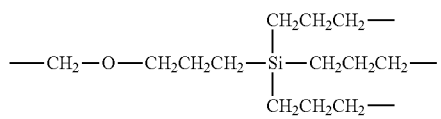
[Chem. 22]
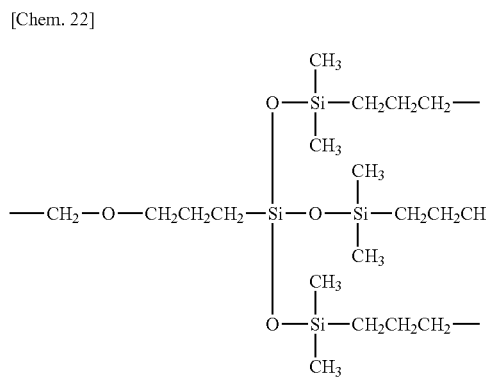
-continued
[Chem. 23]
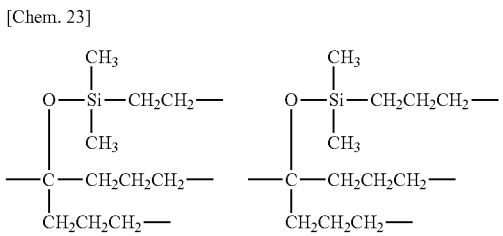
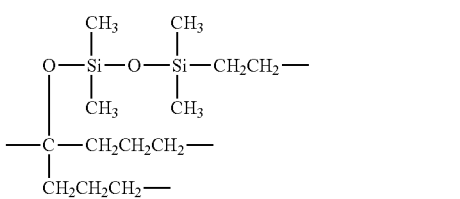
[Chem. 24]
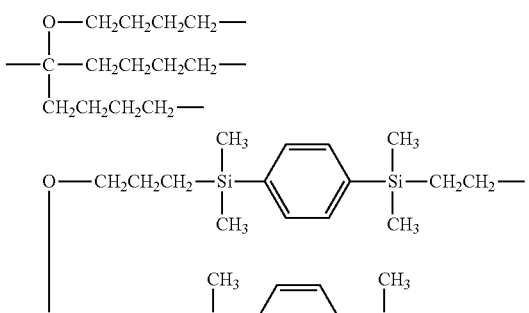
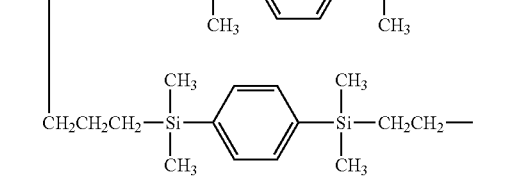
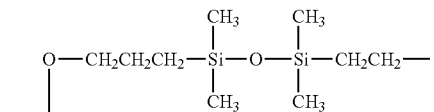
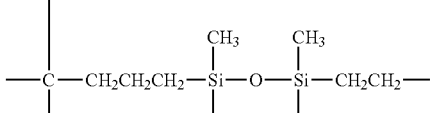
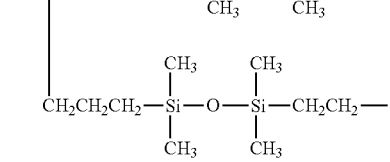
[Chem. 25]
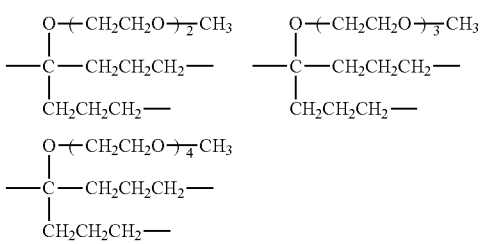

-continued

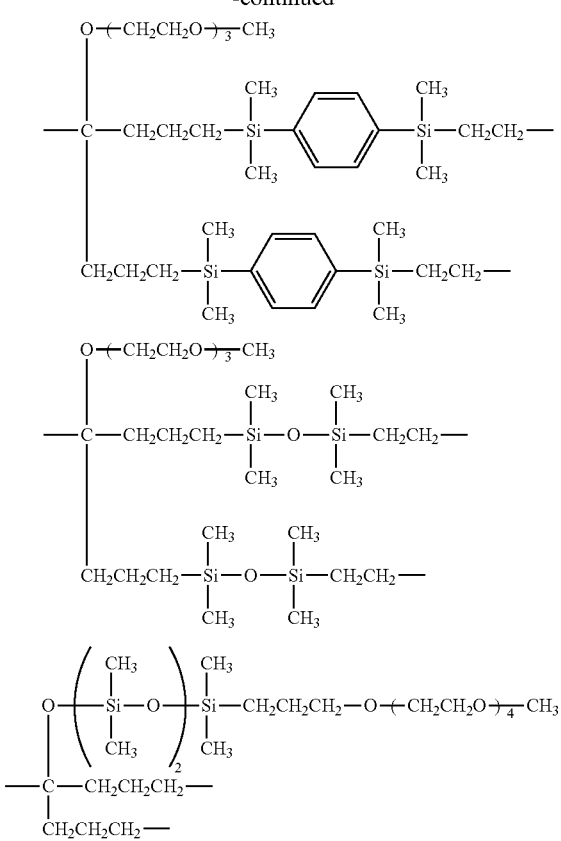

In formula (1), V is independently a monovalent group containing a silyl group terminated with a hydroxyl or hydrolyzable group, which is exemplified by the following structures.

[Chem. 26]

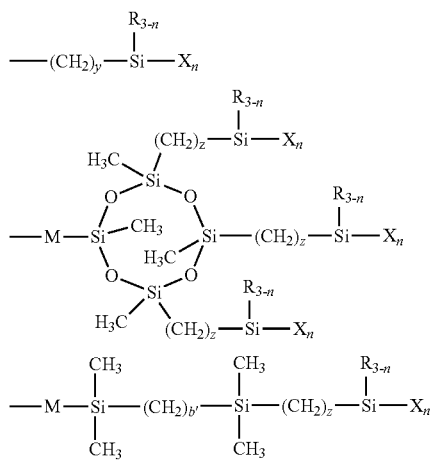

[Chem. 27]

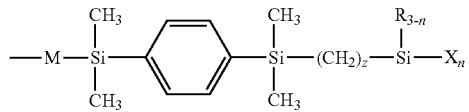

-continued

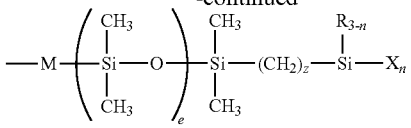

Herein R is independently a $C_1$-$C_4$ alkyl group or phenyl group, X is independently a hydroxyl or hydrolyzable group, M is a single bond or $C_1$-$C_{20}$ divalent organic group which may be fluorinated, b' is an integer of 2 to 6, e is an integer of 1 to 50, y is an integer of 0 to 10, z is independently an integer of 1 to 10, and n is an integer of 1 to 3.

In the above formulae, R is a $C_1$-$C_4$ alkyl group such as methyl, ethyl, propyl or butyl or phenyl group.

X is a hydroxyl or hydrolyzable group. Suitable groups include hydroxyl, $C_1$-$C_{10}$ alkoxy groups such as methoxy, ethoxy, propoxy, and butoxy, $C_2$-$C_{10}$ alkoxyalkoxy groups such as methoxymethoxy and methoxyethoxy, $C_1$-$C_{10}$ acyloxy groups such as acetoxy, $C_2$-$C_{10}$ alkenyloxy groups such as isopropenoxy, and halogen atoms such as fluorine, chlorine, bromine and iodine. Inter alia, methoxy and ethoxy are preferred.

The subscript n is an integer of 1 to 3, preferably 2 or 3, most preferably 3.

In the above formulae, M is a single bond or optionally fluorinated $C_1$-$C_{20}$, preferably $C_2$-$C_8$ divalent organic group, more preferably divalent hydrocarbon group. Examples of the divalent hydrocarbon group include alkylene groups such as methylene, ethylene, propylene (trimethylene, methylethylene), butylene (tetramethylene, methylpropylene), hexamethylene, octamethylene, arylene groups such as phenylene, or mixtures thereof (alkylene-arylene groups), and substituted forms of the foregoing groups in which some or all hydrogen is substituted by fluorine. M is preferably ethylene, propylene or phenylene.

In the above formulae, b' is an integer of 2 to 6, preferably 2 to 4, e is an integer of 1 to 50, preferably 1 to 10, y is an integer of 0 to 10, preferably 2 to 8, and z is an integer of 1 to 10, preferably 2 to 8.

In formula (1), β is an integer of 1 to 9, preferably 1 to 7, more preferably 1 to 6.

In formula (2), Q is independently a single bond or a divalent organic group which may contain an oxygen, silicon or nitrogen atom, that is, a group for linking group Rf to group G. Examples of the group Q include substituted or unsubstituted $C_2$-$C_{12}$ divalent organic groups (e.g., substituted or unsubstituted alkylene, arylene and alkylene-arylene groups) which may contain one or more structures selected from the group consisting of amide bond, ether bond (e.g., (poly)oxyalkylene structure), ester bond, diorganosilylene groups such as dimethylsilylene, groups of the formula: —Si[—OH][—(CH$_2$)$_f$—Si(CH$_3$)$_3$]— wherein f is an integer of 2 to 4, and diorganosiloxane groups, preferably substituted or unsubstituted $C_2$-$C_{12}$ divalent hydrocarbon groups which may contain such structure.

Exemplary of the divalent organic group Q are the following groups.

[Chem. 28]

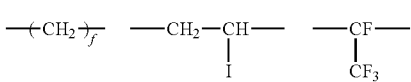

-continued

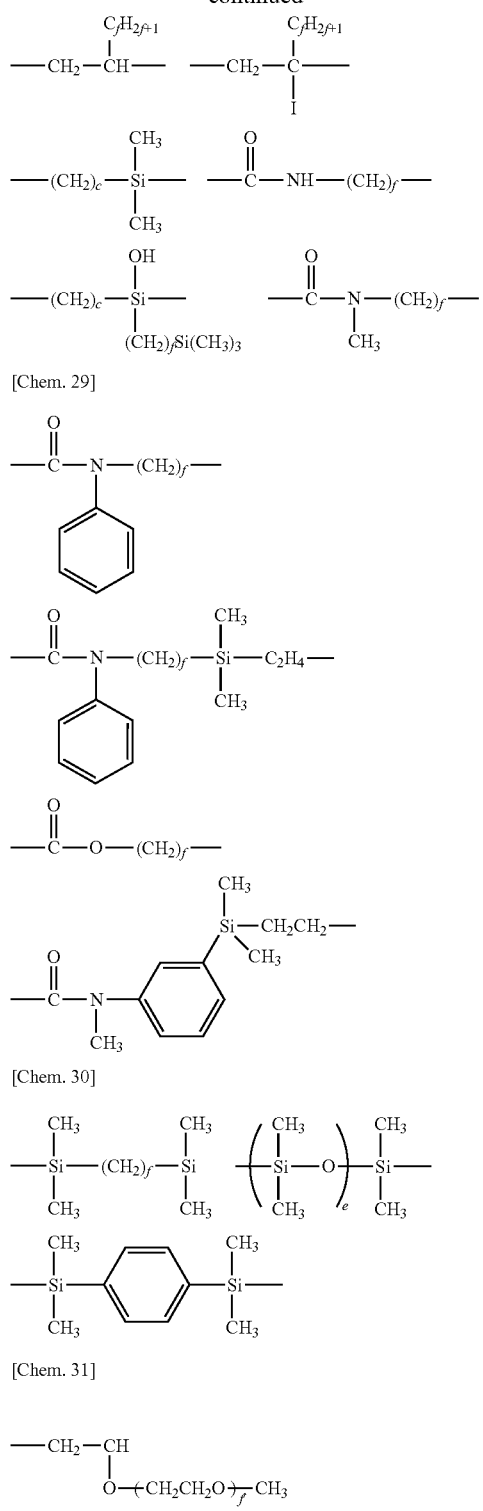

[Chem. 29]

[Chem. 30]

[Chem. 31]

Herein f and f' each are an integer of 2 to 4, c is an integer of 1 to 4, and e is an integer of 1 to 50.

In formula (2), G is independently a divalent organic group containing a silyl group having a hydroxyl or hydrolyzable group, which may contain an ether bond or oxygen atom in the form of (poly)oxyalkylene structure. Examples thereof are shown below.

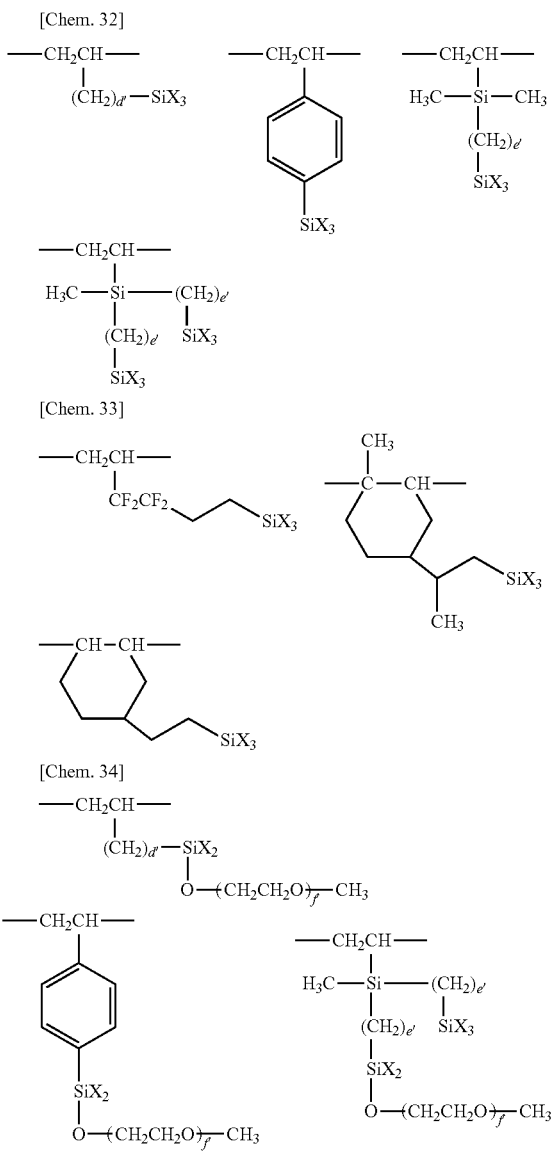

[Chem. 32]

[Chem. 33]

[Chem. 34]

Herein, X and f are as defined above, d' is an integer of 0 to 10, preferably 0 to 8, and e' is an integer of 2 to 10, preferably 3 to 8.

In formula (2), B is independently hydrogen, a $C_1$-$C_4$ alkyl group such as methyl, ethyl, propyl or butyl, or halogen such as fluorine, chlorine, bromine or iodine.

Also in formula (2), 6 is an integer of 1 to 10, preferably 2 to 8.

In formula (4), Y is independently a di- to hexavalent, preferably di- to tetravalent, most preferably divalent organic group which may contain one or more moieties selected from silicon, siloxane bond, silalkylene structure and silarylene structure, preferably a di- to hexavalent, preferably di- to tetravalent, most preferably divalent hydrocarbon group which may contain one or more moieties selected from silicon, siloxane bond, silalkylene structure and silarylene structure. Illustratively, Y is selected from a $C_3$-$C_{10}$ alkylene group such as propylene (trimethylene, methylethylene), butylene (tetramethylene, methylpropylene), or hexamethylene, an alkylene group containing a $C_6$-$C_8$ arylene group (e.g., phenylene), such as $C_8$-$C_{16}$ alkylene-arylene group, a divalent group having alkylene groups bonded via a silalkylene or silarylene structure, and a di- to hexavalent group having a $C_2$-$C_{10}$ alkylene group bonded to a valence bond of a di- to hexavalent linear, branched or cyclic organopolysiloxane residue of 2 to 10 silicon atoms, preferably 2 to 5 silicon atoms. Preferably, Y is selected from a $C_3$-$C_{10}$ alkylene group, an alkylene group containing a $C_6$-$C_8$ arylene group, especially phenylene, a divalent group having alkylene groups bonded via a silalkylene or silarylene structure, and a di- to tetravalent group having a $C_2$-$C_{10}$ alkylene group bonded to a valence bond of a di- to tetravalent linear organopolysiloxane residue of 2 to 10 silicon atoms or di- to tetravalent branched or cyclic organopolysiloxane residue of 3 to 10 silicon atoms. More preferably, Y is a $C_3$-$C_6$ alkylene group.

The silalkylene or silarylene structure is exemplified by the following formula.

[Chem. 35]

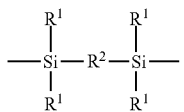

Herein $R^1$ which may be the same or different is a $C_1$-$C_4$ alkyl group such as methyl, ethyl, propyl or butyl, or $C_6$-$C_{10}$ aryl group such as phenyl. $R^2$ is a $C_1$-$C_4$ alkylene group such as methylene, ethylene, propylene (trimethylene, methylethylene), or $C_6$-$C_{10}$ arylene group such as phenylene.

Examples of the di- to hexavalent linear, branched or cyclic organopolysiloxane residue of 2 to 10 silicon atoms, preferably 2 to 5 silicon atoms are given below.

[Chem. 36]

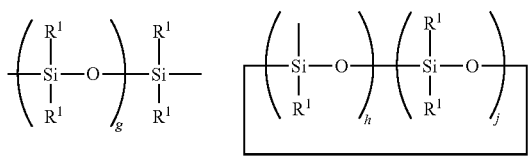

[Chem. 37]

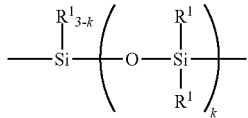

Herein $R^1$ is as defined above, g is an integer of 1 to 9, preferably 1 to 4, h is an integer of 2 to 6, preferably 2 to 4, j is an integer of 0 to 8, preferably 0 or 1, h+j is an integer of 3 to 10, preferably 3 to 5, and k is an integer of 1 to 3, preferably 2 or 3.

Examples of the group Y are shown below.

[Chem. 38]

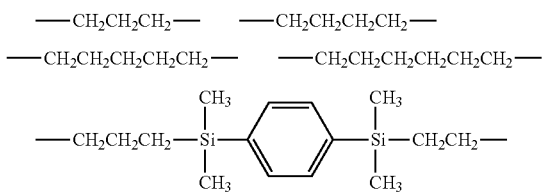

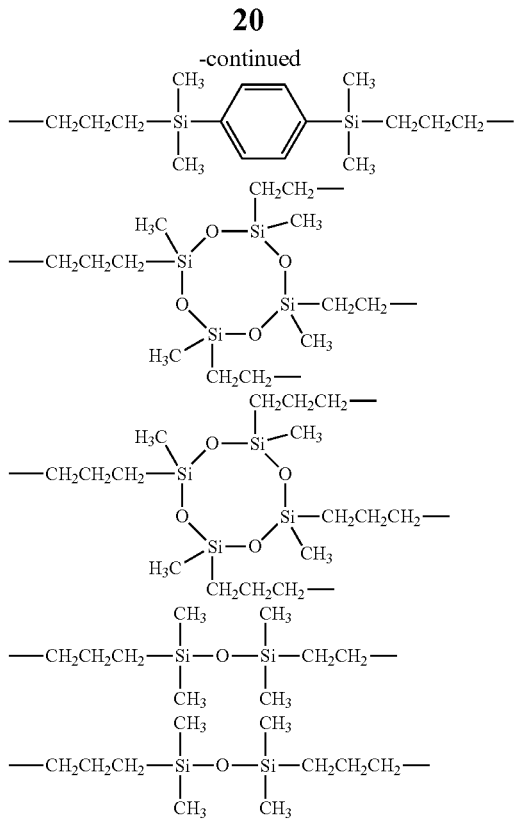

In formula (4), m is an integer of 1 to 5, preferably 1 to 4.

In formula (4), W is independently hydrogen or a group having the formula (4a) or (4b).

[Chem. 39]

(4a)

Herein R, X and n are as defined above, Y' is a di- to hexavalent organic group which may contain a silicon atom and/or siloxane bond, and "a" is an integer of 1 to 5, preferably 1 to 3.

[Chem. 40]

(4b)

Herein R is as defined above, T is a single bond, divalent siloxane bond or silylene group, L is independently a $C_1$-$C_4$ alkylene group, and b is an integer of 1 to 20.

In formula (4a), Y' is a di- to hexavalent, preferably di- to tetravalent, most preferably divalent organic group which may contain silicon and/or siloxane bond, preferably a di- to hexavalent, preferably di- to tetravalent, most preferably divalent hydrocarbon group which may contain silicon and/or siloxane bond.

Illustratively, Y' is selected from a $C_2$-$C_{10}$, preferably $C_3$-$C_{10}$ alkylene group such as ethylene, propylene (trimethylene, methylethylene), butylene (tetramethylene, methylpropylene) or hexamethylene, an alkylene group containing a $C_6$-$C_{10}$, preferably $C_6$-$C_8$ arylene group (e.g., phenylene), such as $C_8$-$C_{16}$ alkylene-arylene group, a $C_2$-$C_{10}$ oxyalkylene group, a $C_2$-$C_6$ alkylene group containing a diorganosilylene group (e.g., dimethylsilylene or diethylsilylene), a divalent group having alkylene groups bonded via a silalkylene or silarylene structure, a $C_2$-$C_6$ alkylene group containing di- to hexavalent linear, branched or cyclic organopolysiloxane residue of 2 to 10 silicon atoms, preferably 2 to 5 silicon atoms, and a di- to hexavalent group having a $C_2$-$C_{10}$ alkylene group bonded to a valence bond of a di- to hexavalent linear, branched or cyclic organopolysiloxane residue of 2 to 10 silicon atoms, preferably 2 to 5 silicon atoms. Preferably, Y' is selected from a $C_3$-$C_{10}$ alkylene group, an alkylene group containing phenylene, a $C_2$-$C_6$ alkylene group containing dimethylsilylene, a divalent group having alkylene groups bonded via a silalkylene or silarylene structure, a $C_2$-$C_6$ alkylene group containing divalent linear organopolysiloxane residue of 2 to 10 silicon atoms, and a di- to tetravalent group having a $C_2$-$C_{10}$ alkylene group bonded to a valence bond of a di- to tetravalent linear organopolysiloxane residue of 2 to 10 silicon atoms, or a di- to tetravalent group having a $C_2$-$C_{10}$ alkylene group bonded to a valence bond of a di- to tetravalent branched or cyclic organopolysiloxane residue of 3 to 10 silicon atoms. More preferably Y' is a $C_3$-$C_6$ alkylene group.

Examples of the silalkylene structure, silarylene structure, and di- to hexavalent linear, branched or cyclic organopolysiloxane residue of 2 to 10 silicon atoms, preferably 2 to 5 silicon atoms are as exemplified above.

Illustrative examples of the group Y' are shown below.

[Chem. 41]

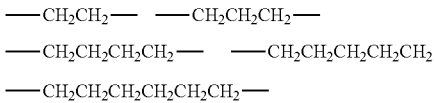

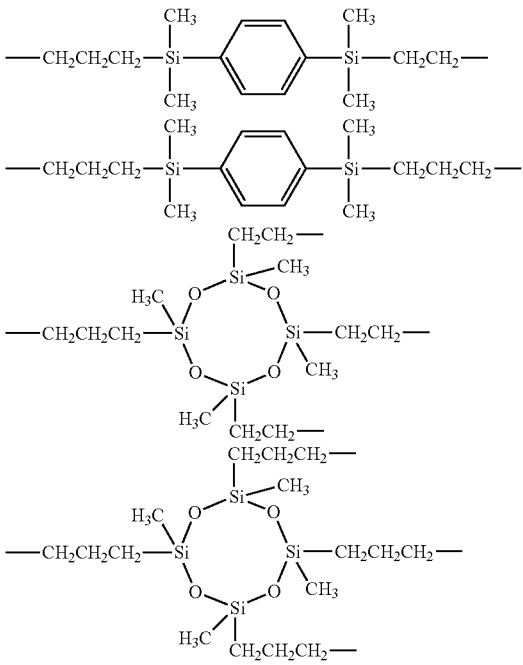

[Chem. 42]

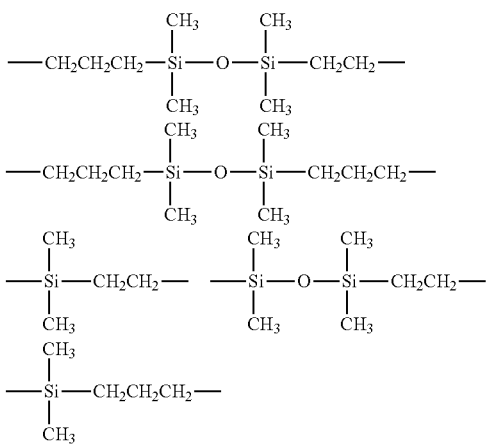

In formula (4a), "a" is an integer of 1 to 5, preferably 1 to 3, most preferably 1.

In formula (4b), T is a single bond, divalent siloxane bond or silylene group, illustratively a single bond, divalent linear organopolysiloxane residue of 2 to 10 silicon atoms or divalent branched or cyclic organopolysiloxane residue of 3 to 10 silicon atoms, linear silalkylene or silarylene structure of 2 to 10 silicon atoms, preferably a single bond, divalent linear organopolysiloxane residue of 2 to 4 silicon atoms, silalkylene or silarylene structure, most preferably a single bond.

Examples of the divalent linear organopolysiloxane residue of 2 to 10 silicon atoms, preferably 2 to 4 silicon atoms, divalent branched or cyclic organopolysiloxane residue of 3 to 10 silicon atoms, and silalkylene or silarylene structure of 2 to 10 silicon atoms are as exemplified above.

Examples of the divalent siloxane bond and silylene group (inclusive of silalkylene and silarylene structures) represented by T are shown below.

[Chem. 43]

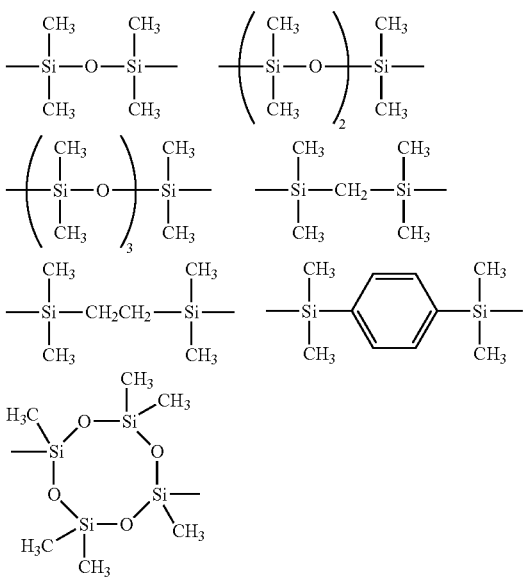

In formula (4b), L is independently a $C_1$-$C_4$ alkylene group such as methylene, ethylene, propylene or butylene, and may be of the same or different carbon counts.

In formula (4b), b is an integer of 1 to 20, preferably 1 to 10.

In formula (5), D is independently a single bond or a divalent organic group which may contain an ether bond and/or silicon atom and which may be fluorinated, preferably a single bond, or a divalent hydrocarbon group such as a $C_2$-$C_6$ alkylene group which may contain an ether bond and/or silicon atom (diorganosilylene group), $C_2$-$C_6$ alkylene group which may contain an ether bond and/or silicon atom (diorganosilylene group) or $C_6$-$C_1$ arylene group, more preferably a divalent hydrocarbon group which may contain one or more moieties selected from an ether bond, diorganosilylene group, silalkylene structure, and silarylene structure. Illustratively, D is selected from a $C_2$-$C_6$ alkylene group such as ethylene, propylene (trimethylene, methylethylene), butylene (tetramethylene, methylpropylene) or hexamethylene, alkylene group containing a $C_6$-$C_{10}$ arylene group (e.g., phenylene), such as $C_8$-$C_{16}$ alkylene-arylene group, $C_2$-$C_6$ oxyalkylene group, $C_2$-$C_6$ alkylene group containing diorganosilylene group (e.g., dimethylsilylene or diethylsilylene), silalkylene group, silarylene group, a divalent group having a $C_2$-$C_6$ alkylene or $C_2$-$C_6$ oxyalkylene group bonded to a silalkylene or silarylene structure, or a divalent group having $C_2$-$C_6$ alkylene and/or $C_2$-$C_6$ oxyalkylene groups bonded via a silalkylene or silarylene structure.

Examples of the silalkylene and silarylene structures are as exemplified above.

Examples of the group D are shown below.

[Chem. 44]

—CH$_2$CH$_2$—    —CH$_2$—O—CH$_2$—

—CH$_2$CH$_2$CH$_2$—    —CH$_2$CH$_2$CH$_2$CH$_2$—

—CH$_2$—O—CH$_2$CH$_2$CH$_2$—    —CH$_2$CH$_2$CH$_2$CH$_2$CH$_2$—

[Chem. 45]

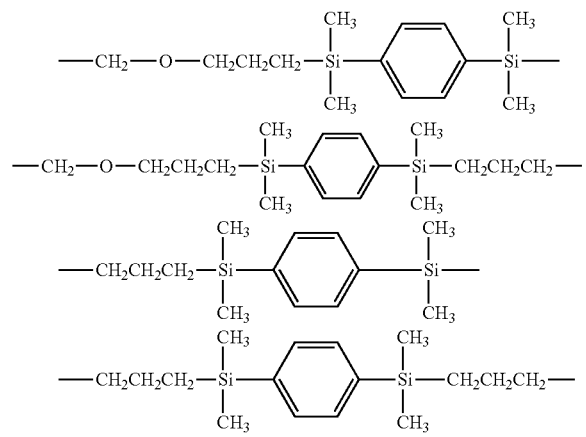

In formula (5), Z is independently a single bond, or a group selected from trivalent group of the formula: —C(J)= (wherein J is an alkyl, preferably $C_1$-$C_3$ alkyl group, hydroxyl group or silyl ether group of the formula: K$_3$SiO— wherein K is independently hydrogen, preferably $C_1$-$C_3$ alkyl, preferably $C_6$-$C_{10}$ aryl such as phenyl, or preferably $C_1$-$C_3$ alkoxy), trivalent group of the formula: —Si(L')= (wherein L' is preferably $C_1$-$C_3$ alkyl), tetravalent group of the formula: —C≡, tetravalent group of the formula: —Si≡, and di- to octavalent, preferably di- to tetravalent siloxane residue. When a siloxane bond is contained, linear, branched or cyclic organopolysiloxane residues of 2 to 13 silicon atoms, specifically 2 to 5 silicon atoms are preferred.

Preferred are organopolysiloxane residues having a $C_1$-$C_8$, more preferably $C_1$-$C_4$ alkyl group such as methyl, ethyl, propyl or butyl, or phenyl group.

Examples of the group Z include a single bond and the groups shown below.

[Chem. 46]

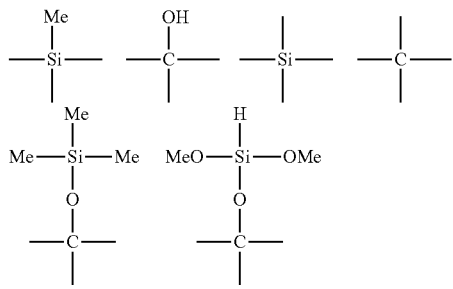

[Chem. 47]

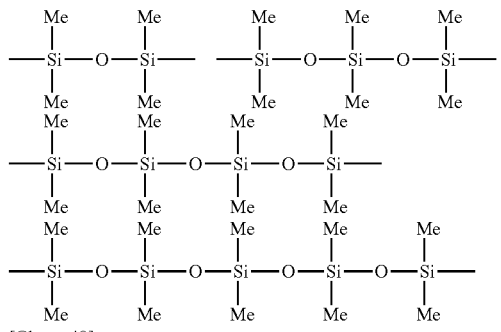

[Chem. 48]

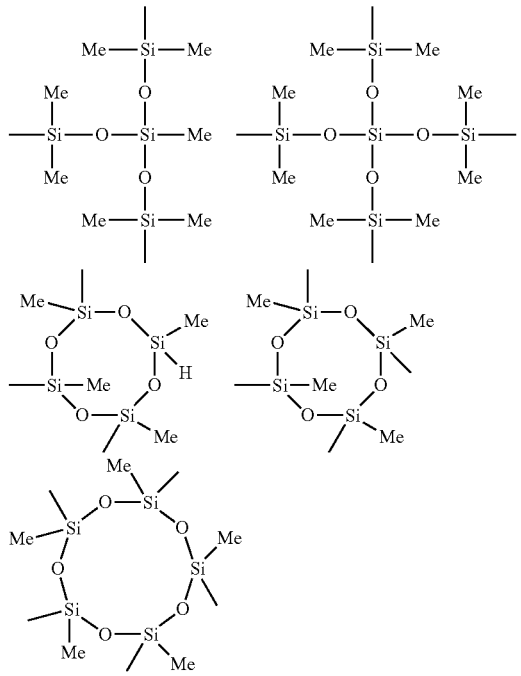

Herein Me stands for methyl.

In formula (5), E is independently a $C_1$-$C_5$ alkylene group which may contain one or more moieties selected from oxygen, diorganosilylene group (e.g., dimethylsilylene) and diorganosiloxane structure (e.g., dimethylsiloxane). Included are the following groups.

[Chem. 49]

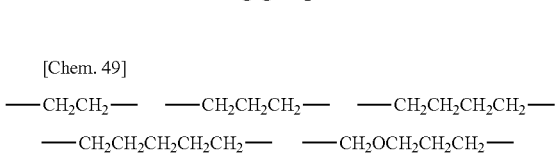

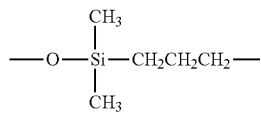

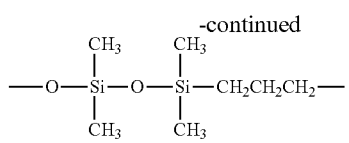

In formula (5), m' is an integer of 1 to 7, preferably 1 to 3.

The following structures are exemplary of the fluorooxyalkylene-containing polymer-modified, hydrolyzable group-containing silane or siloxane represented by formula (1), (4) or (5).

[Chem. 50]

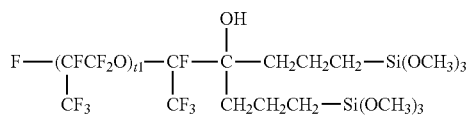

[Chem. 51]

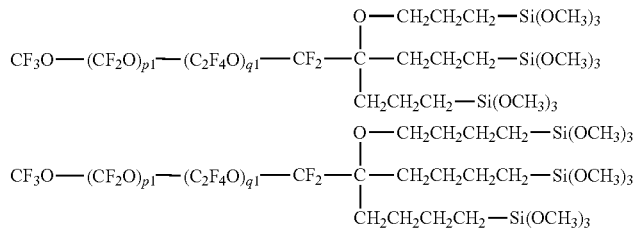

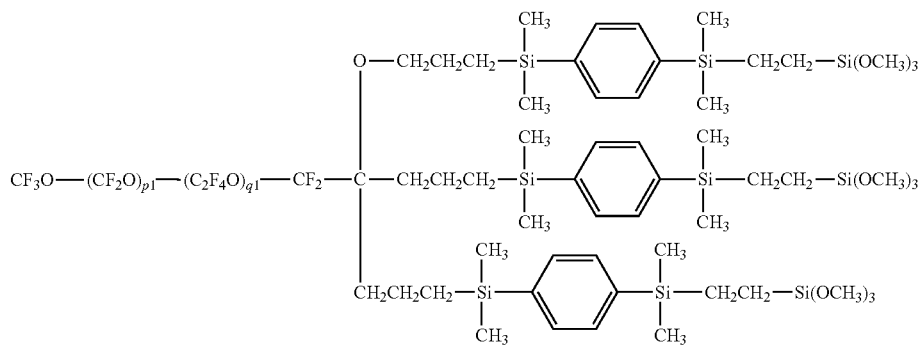

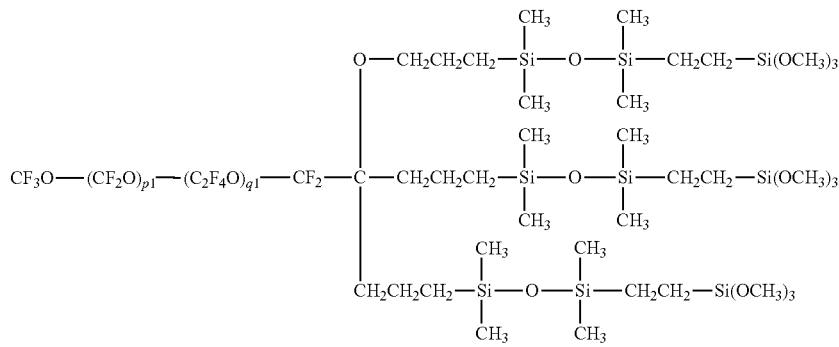

-continued
[Chem. 52]
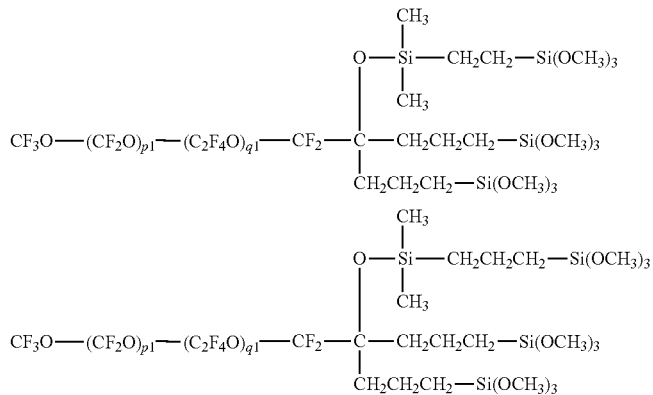
[Chem. 53]
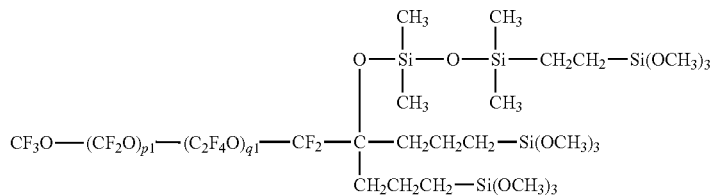
[Chem. 54]
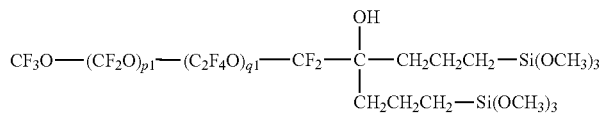
[Chem. 55]
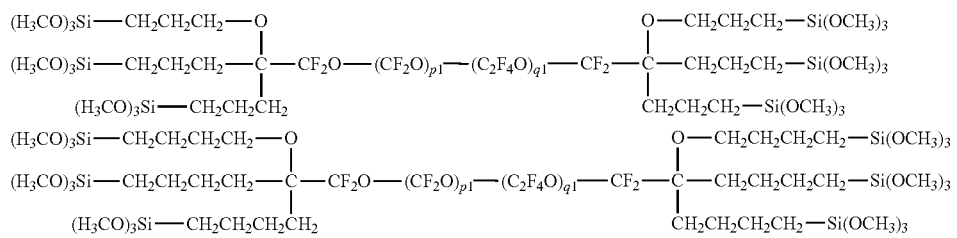
[Chem. 56]
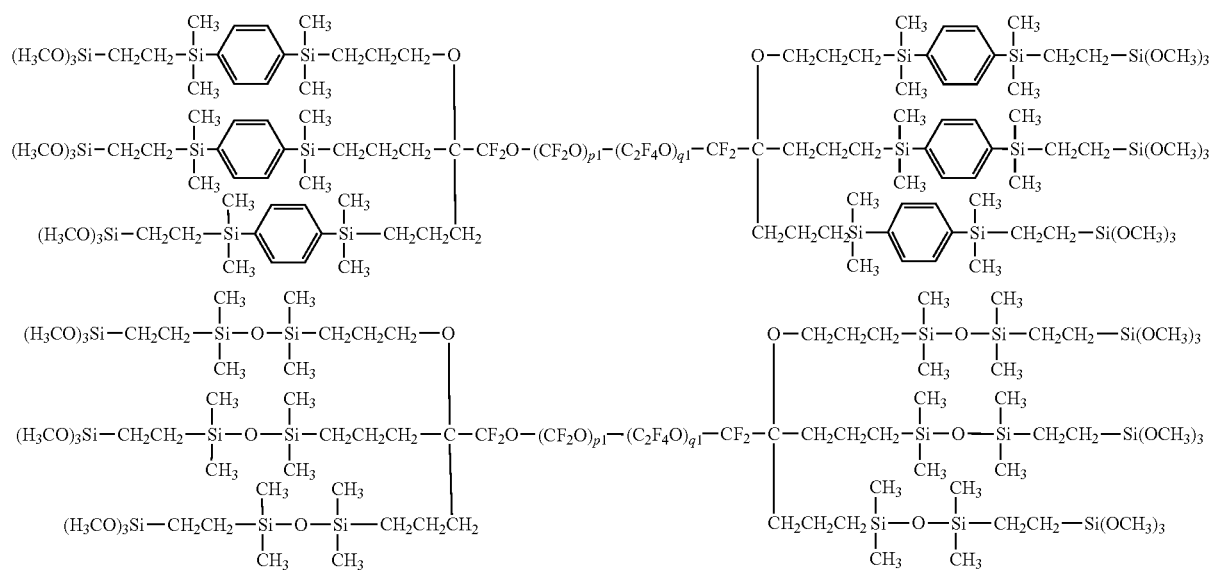

-continued
[Chem. 57]
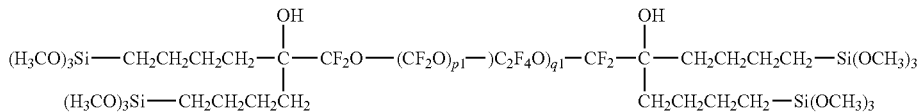
[Chem. 58]
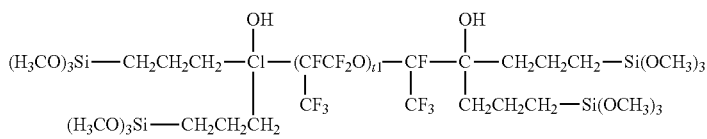
[Chem. 59]
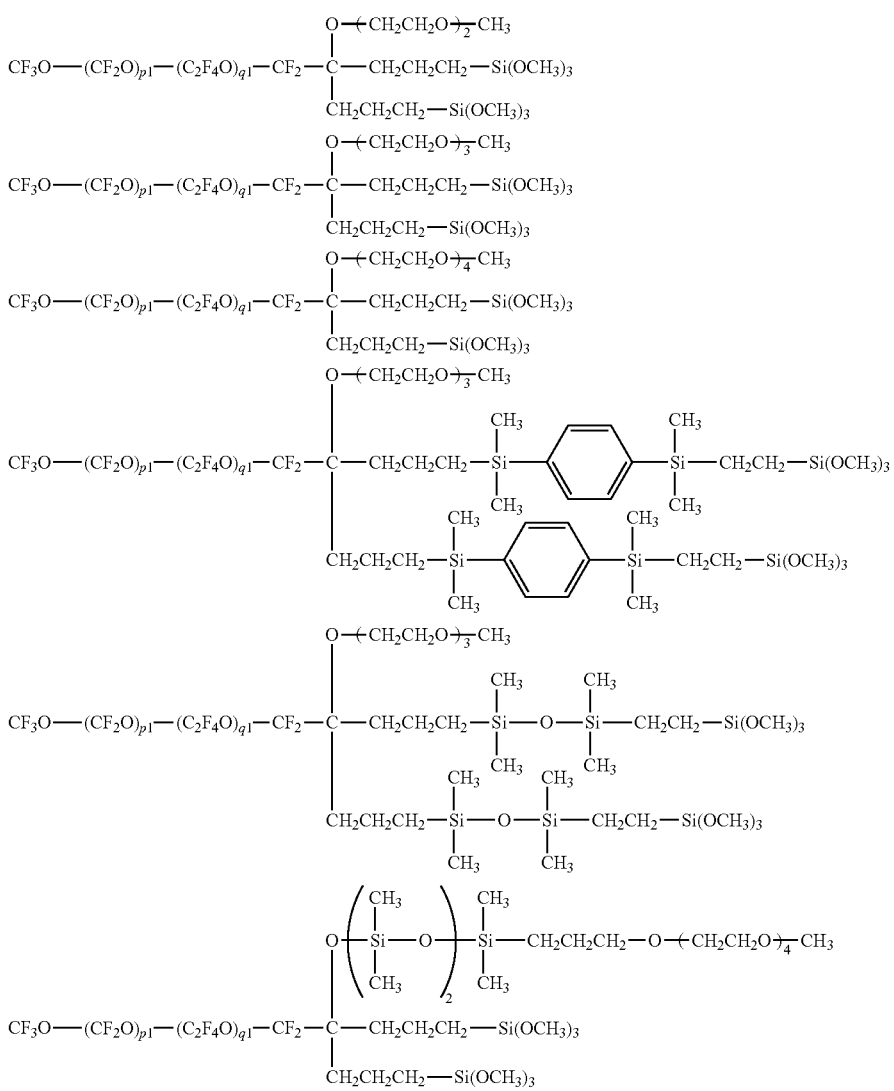
[Chem. 60]
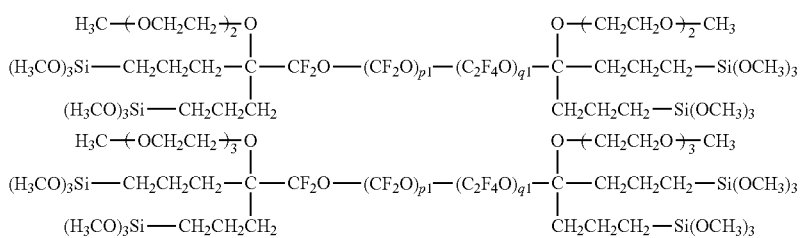

-continued
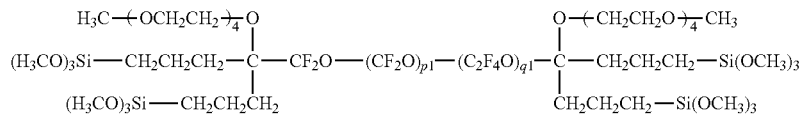
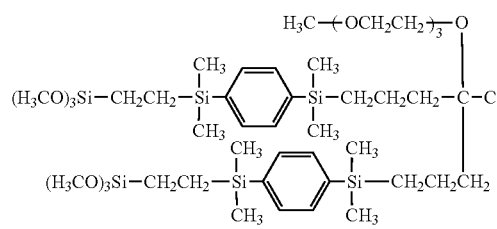
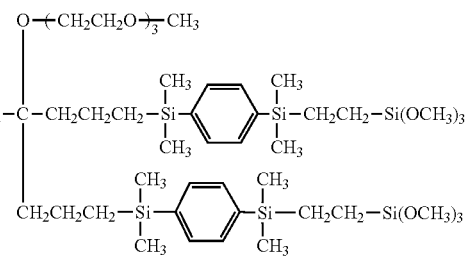
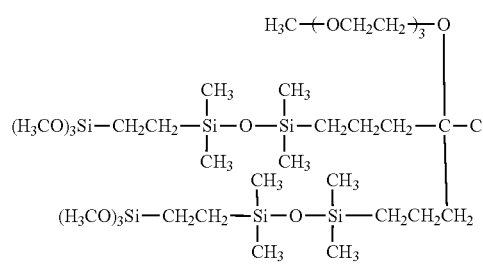
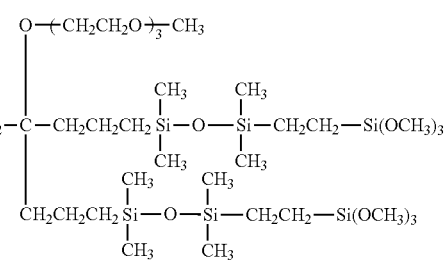
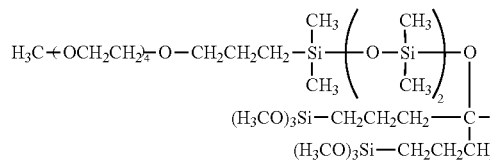
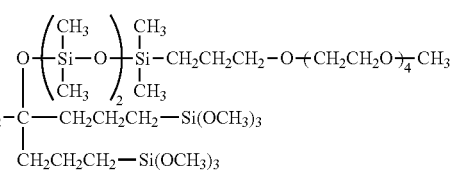
[Chem. 61]
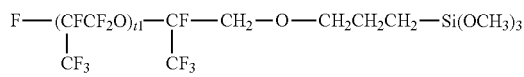
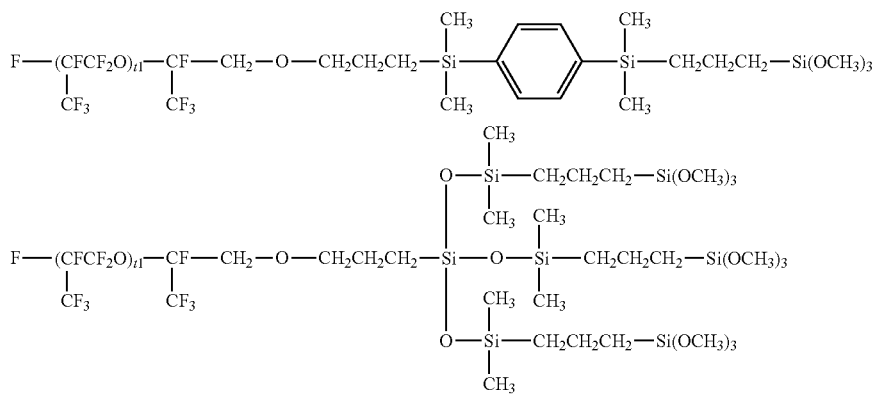
[Chem. 62]
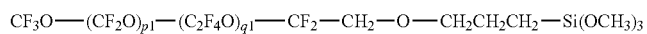
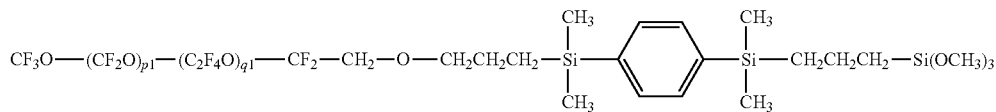

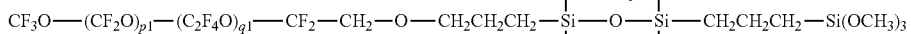
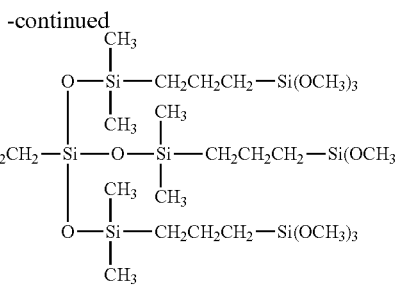
[Chem. 63]
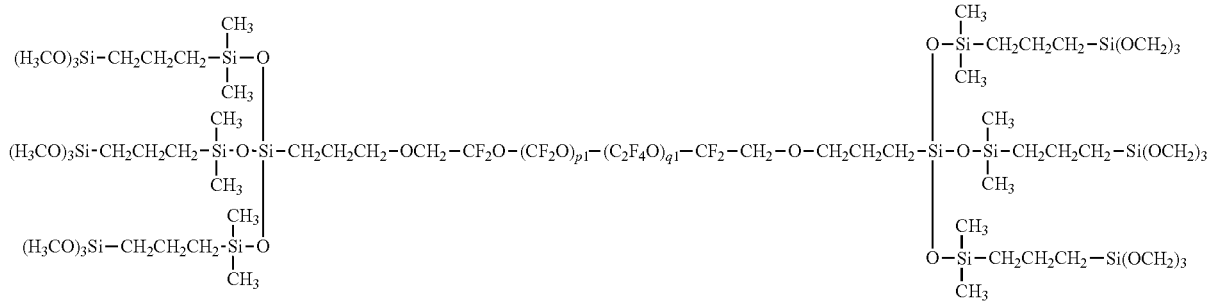
Herein p1 is an integer of 5 to 100, q1 is an integer of 5 to 100, p1+q1 is an integer of 10 to 105, t1 is an integer of 3 to 100. The units in parentheses may be randomly arranged.
The following structures are exemplary of the fluorooxyalkylene-containing polymer-modified, hydrolyzable group-containing silane or siloxane represented by formula (2).
[Chem. 64]
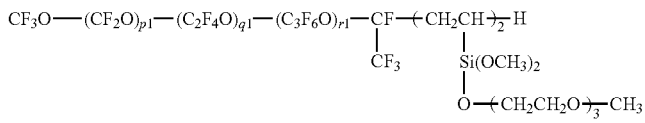
[Chem. 65]
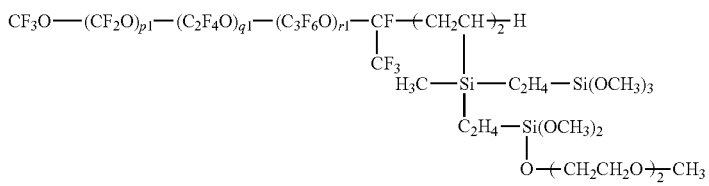
[Chem. 66]
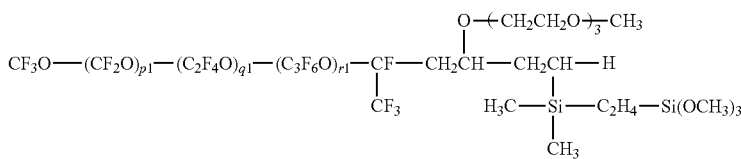
[Chem. 67]
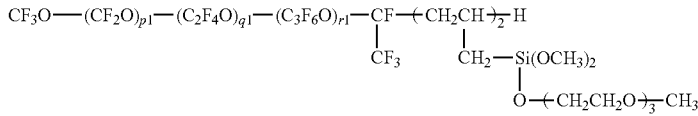

[Chem. 68]
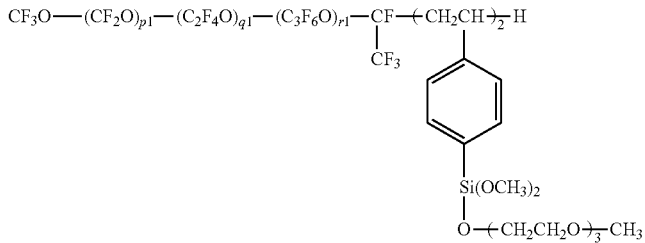
[Chem. 69]
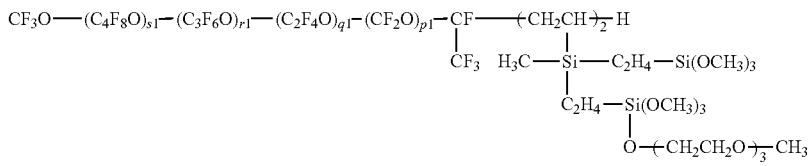
[Chem. 70]
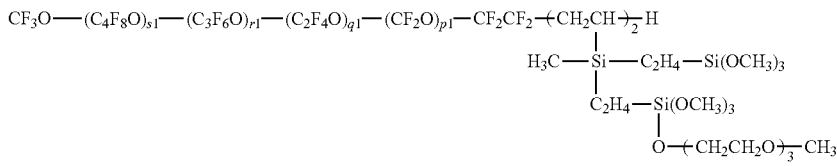
[Chem. 71]
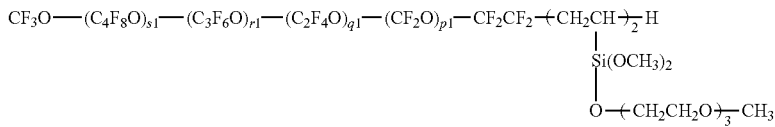
[Chem. 72]
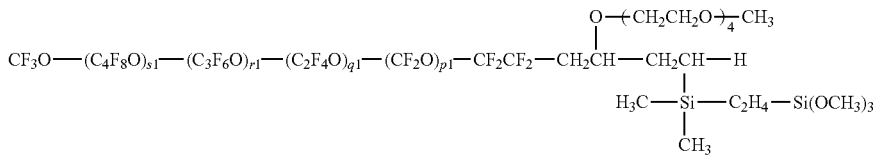
[Chem. 73]
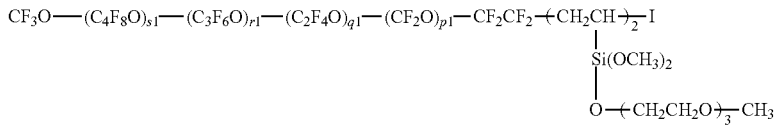
[Chem. 74]
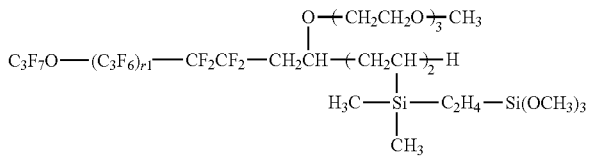
[Chem. 75]
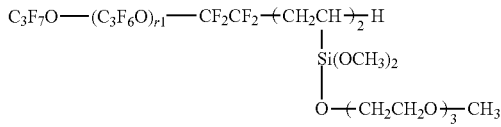

[Chem. 76]

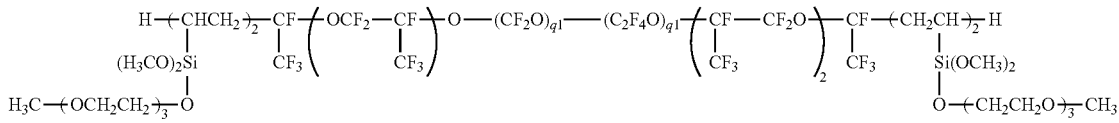

Herein p1 is an integer of 5 to 100, q1 is an integer of 5 to 100, p1+q1 is an integer of 10 to 105, r1 is an integer of 1 to 100, s1 is an integer of 1 to 100, p1+q1+r1+s1 is an integer of 12 to 199. The units in parentheses may be randomly arranged.

Component (B)

Component (B) is a fluorooxyalkylene-containing polymer-modified polysilazane composed of fluorooxyalkylene-containing polymer-modified silazane units. Preferably, it is a fluorooxyalkylene-containing polymer-modified polysilazane composed of fluorooxyalkylene-containing polymer-modified silazane units, represented by the general formula (3).

Herein Rf and α are as defined above, A' is independently a divalent organic group which may contain an oxygen, silicon or nitrogen atom and which may be fluorinated.

In formula (3), Rf is as defined above, and examples thereof are as exemplified above for Rf in formula (1).

In formula (3), α is 1 or 2, preferably 1.

In formula (3), A' is independently a divalent organic group which may contain an oxygen, silicon or nitrogen atom and which may be fluorinated, preferably a $C_2$-$C_{20}$, especially $C_2$-$C_{10}$ divalent hydrocarbon group which may contain an oxygen, silicon or nitrogen atom and which may be fluorinated. It is a group for linking the fluorooxyalkylene-containing polymer residue to the silazane group.

A' is preferably a $C_2$-$C_{10}$, especially $C_2$-$C_4$ alkylene group such as —$CH_2CH_2$— or —$CH_2CH_2CH_2$—, a $C_2$-$C_{10}$, especially $C_2$-$C_4$ oxyalkylene group such as —$CH_2OCH_2CH_2CH_2$—, an amide group of the formula: —$CONR^3$— wherein $R^3$ is hydrogen or a $C_1$-$C_5$, especially $C_1$-$C_3$ lower alkyl group, a divalent group having $C_2$-$C_6$ alkylene groups bonded via a silalkylene or silarylene structure, or a group obtained by combining two or more of the foregoing.

More preferred examples of the group A' are shown below.

[Chem. 77]

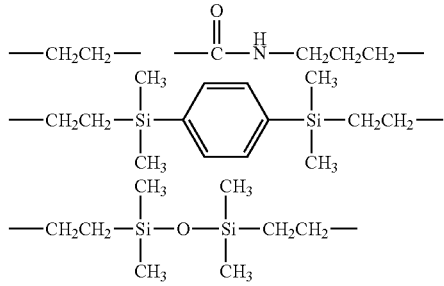

The fluorooxyalkylene-containing polymer-modified polysilazane composed of fluorooxyalkylene-containing polymer-modified silazane units as component (B) is preferably a polysilazane compound composed of fluorooxyalkylene-containing polymer-modified silazane units having formula (3). Suitable structures of the fluorooxyalkylene-containing polymer-modified silazane unit having formula (3) include the following structures.

[Chem. 78]

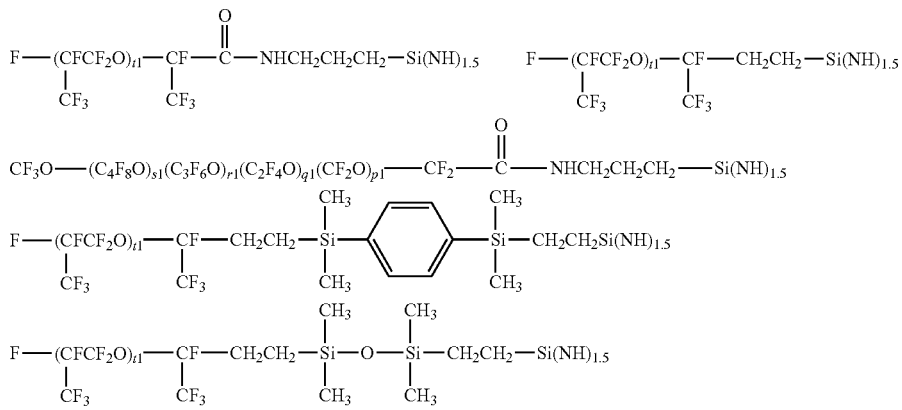

Herein p1, q1, r1, s1 and t1 are as defined above.

The invention also provides a surface treating agent comprising the fluorinated coating composition comprising (A) one or more compounds selected from hydroxyl or hydrolyzable group-containing silanes and siloxanes modified with a fluorooxyalkylene-containing polymer, and partial (hydrolytic) condensates thereof, and (B) a fluorooxyalkylene-containing polymer-modified polysilazane composed of fluorooxyalkylene-containing polymer-modified silazane units, wherein components (A) and (B) are mixed in a weight ratio (A:B) of from 10:90 to 90:10, provided that the total weight of components (A) and (B) is 100.

To the surface treating agent, a hydrolytic condensation catalyst may be added if necessary. Suitable catalysts include organotin compounds such as dibutyltin dimethoxide and dibutyltin dilaurate, organotitanium compounds such as tetra-n-butyl titanate, organic acids such as acetic acid, methanesulfonic acid and fluorine-modified carboxylic acids, and inorganic acids such as hydrochloric acid and sulfuric acid.

The surface treating agent may further comprise a suitable solvent. Such solvents include fluorine-modified aliphatic hydrocarbon solvents (e.g., perfluoroheptane and perfluorooctane), fluorine-modified aromatic hydrocarbon solvents (e.g., 1,3-bis(trifluoromethyl)benzene), fluorine-modified ether solvents (e.g., methyl perfluorobutyl ether, ethyl perfluorobutyl ether, perfluoro(2-butyltetrahydrofuran)), fluorine-modified alkylamine solvents (e.g., perfluorotributylamine, perfluorotripentylamine), hydrocarbon solvents (e.g., petroleum benzine, toluene, xylene), and ketone solvents (e.g., acetone, methyl ethyl ketone, methyl isobutyl ketone). Of these, fluorine-modified solvents are desirable in view of solubility and wettability, with 1,3-bis(trifluoromethyl)benzene, perfluoro(2-butyltetrahydrofuran), perfluorotributylamine, and ethyl perfluorobutyl ether being most desirable.

The solvents may be used in admixture of two or more while it is preferred that the fluoropolyether-containing polymers and partial (hydrolytic) condensates thereof be uniformly dissolved in the solvent. An optimum concentration of the fluoropolyether-containing polymers and partial (hydrolytic) condensates thereof (components (A) and (B)) in the solvent varies with a particular treating mode. The amount which is easy to weigh may be chosen. In the case of direct coating, the concentration is preferably 0.01 to 10 parts by weight, more preferably 0.05 to 5 parts by weight per 100 parts by weight of the solvent and the fluoropolyether-containing polymers and partial (hydrolytic) condensate thereof as components (A) and (B) combined. In the case of evaporation treatment, the concentration is preferably 1 to 100 parts by weight, more preferably 3 to 30 parts by weight per 100 parts by weight of the solvent and components (A) and (B) combined.

The surface treating agent may be applied to a substrate by any well-known techniques such as brush coating, dipping, spraying, and evaporation. In the case of evaporation, the heating mode may be either resistance heating or EB heating and is not particularly limited. The curing temperature and time vary with a particular curing technique. For example, in the case of direct coating (brush coating, dipping or spraying), suitable curing conditions include a temperature of 25 to 200° C., especially 25 to 80° C. for 30 minutes to 36 hours, especially 1 to 24 hours. In the case of evaporation treatment, desirable curing conditions include 20 to 200° C., especially 25 to 120° C. and 30 minutes to 48 hours, especially 1 to 24 hours. Curing under humid conditions is also useful. The cured coating typically has a thickness of 0.1 to 100 nm, desirably 1 to 20 nm although the thickness is selected depending on the type of substrate. Also, in the case of spray coating, for example, a procedure involving diluting the agent with a fluorochemical solvent having water previously added thereto, for thereby effecting hydrolysis of components (A) and (B) in the agent to generate Si—OH, and thereafter, spraying the dilution is recommended because the coating rapidly cures.

The substrate to be treated with the surface treating agent is not particularly limited, and may be made of any desired materials including paper, fabric, metals, metal oxides, glass, plastics, ceramics, and quartz. The surface treating agent is effective for endowing the substrate with water/oil repellency. In particular, the surface treating agent is advantageously used for the surface treatment of $SiO_2$-deposited glass and film.

Preferred articles which may be treated with the surface treating agent include car navigation systems, mobile phones, smart phones, digital cameras, digital video cameras, PDA, portable audio players, car audio players, game consoles, eyeglass lenses, camera lenses, lens filters, sunglasses, medical instruments (e.g., gastroscopes), copiers, personal computers, LC displays, organic EL displays, plasma displays, touch panel displays, protective film, anti-reflective film, and other optical articles, vehicle windshield, side mirrors, rear monitor camera lenses, and other articles requiring light resistance.

EXAMPLES

Examples and Comparative Examples are shown below for further illustrating the invention although the invention is not limited thereby.

There were furnished Compounds 1 to 4, shown below, as component (A): the fluorooxyalkylene-containing polymer-modified, hydrolyzable group-containing silane compound, and Compounds 5 and 6, shown below, as component (B): the fluorooxyalkylene-containing polymer-modified polysilazane composed of fluorooxyalkylene-containing polymer-modified silazane units. Notably, Mn of perfluoropolyether chain is measured by $^{19}$F-NMR spectroscopy.

[Compound 1]

Fluorooxyalkylene-containing polymer-modified, hydrolyzable group-containing silane compound (Mn of perfluoropolyether chain=5,929), represented by the formula below.

[Chem. 79]

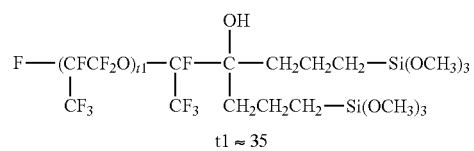

[Compound 2]

Fluorooxyalkylene-containing polymer-modified, hydrolyzable group-containing silane compound (Mn of perfluoropolyether chain=4,113), represented by the formula below.

[Chem. 80]

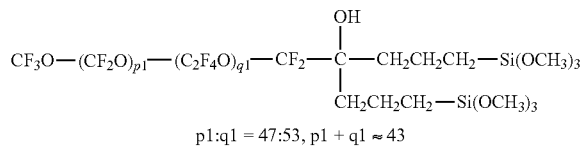

[Compound 3]

Fluorooxyalkylene-containing polymer-modified, hydrolyzable group-containing silane compound (Mn of perfluoropolyether chain=4,113), represented by the formula below.

[Chem. 81]

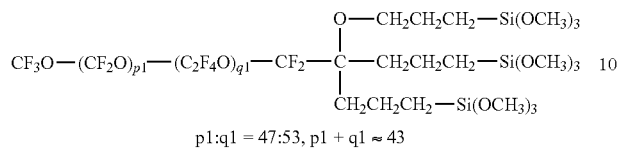

p1:q1 = 47:53, p1 + q1 ≈ 43

[Compound 4]

Fluorooxyalkylene-containing polymer-modified, hydrolyzable group-containing silane compound (Mn of perfluoropolyether chain=2,150), represented by the formula below.

[Chem. 82]

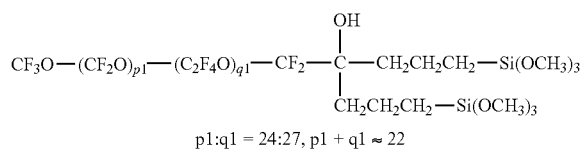

p1:q1 = 24:27, p1 + q1 ≈ 22

[Compound 5]

Polysilazane compound composed of fluorooxyalkylene-containing polymer-modified silazane units (Mn of perfluoropolyether chain in fluorooxyalkylene-containing polymer-modified silazane unit=949), represented by the formula below.

[Chem. 83]

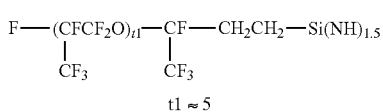

t1 ≈ 5

[Compound 6]

Polysilazane compound composed of fluorooxyalkylene-containing polymer-modified silazane units (Mn of perfluoropolyether chain in fluorooxyalkylene-containing polymer-modified silazane unit=16,720), represented by the formula below.

[Chem. 84]

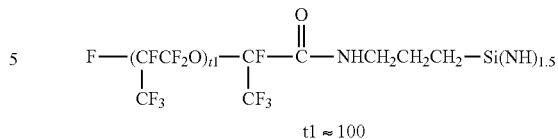

t1 ≈ 100

Examples 1 to 4 and Comparative Examples 1 to 5

Preparation of Surface Treating Agent and Formation of Cured Film

A surface treating agent was prepared by mixing Compound 1, 2, 3 or 4 as component (A): the fluorooxyalkylene-containing polymer-modified, hydrolyzable group-containing silane compound, with Compound 5 or 6 as component (B): the fluorooxyalkylene-containing polymer-modified polysilazane composed of fluorooxyalkylene-containing polymer-modified silazane units in the ratio shown in Table 1, and dissolving them in ethyl perfluorobutyl ether (Novec 7200 by 3M) in a concentration of 20 wt %.

Onto Gorilla glass (Corning Inc.), which had been treated with $SiO_2$ of 10 nm thick on its outermost surface, 4 μL of each surface treating agent was vacuum evaporated under conditions: pressure $2.0 \times 10^{-2}$ Pa and heating temperature 700° C., and cured in an atmosphere of 25° C. and humidity 50% RH for 12 hours to from a cured film of 8 nm thick.

TABLE 1

|  | | Component (A) | Component (B) | Ratio of component (A), wt % | Ratio of component (B), wt % |
|---|---|---|---|---|---|
| Example | 1 | Compound 1 | Compound 5 | 50 | 50 |
|  | 2 | Compound 2 | Compound 5 | 50 | 50 |
|  | 3 | Compound 2 | Compound 5 | 70 | 30 |
|  | 4 | Compound 3 | Compound 5 | 50 | 50 |
| Comparative Example | 1 | Compound 3 | Compound 6 | 50 | 50 |
|  | 2 | Compound 4 | Compound 6 | 50 | 50 |
|  | 3 | Compound 2 | — | 100 | 0 |
|  | 4 | — | Compound 5 | 0 | 100 |
|  | 5 | Compound 1 | Compound 5 | 5 | 95 |

The cured films of Examples 1 to 4 and Comparative Examples 1 to 5 were evaluated by the following methods. All the tests were performed at 25° C. and humidity 40% RH.

Evaluation of Water Repellency

[Evaluation of Initial Water Repellency]

The glass sample with the cured film, prepared above, was tested using a contact angle meter Drop Master (Kyowa Interface Science Co., Ltd.). The cured film was measured for a contact angle with water (water repellency) under conditions: droplet 2 μL, temperature 25° C., humidity 40% RH. The contact angle with water was measured after 1 second from landing of a droplet of 2 μL on the sample surface. The results (initial contact angle with water) are shown in Table 2.

At the initial, Examples and Comparative Examples showed satisfactory water repellency.

[Evaluation of Abrasion Resistance]

The glass sample with the cured film, prepared above, was tested by using a rubbing tester (Shinto Scientific Co., Ltd.) and rubbing the cured film under the following conditions over 5,000 cycles. Thereafter, the cured film was similarly measured for a contact angle with water (water repellency) as an index of abrasion resistance. The test conditions included 25° C. and humidity 40% RH. The results (contact angle with water after abrasion) are shown in Table 2.

Steel Wool Abrasion Resistance
   steel wool: Bonstar #000 (Nippon Steel Wool Co., Ltd.)
   rubbing distance (one way): 30 mm
   rubbing speed: 3,600 mm/min
   load: 1 kg/cm$^2$

[Evaluation of Weather Resistance]

The glass sample with the cured film, prepared above, was tested by using Suntest XLS (Toyo Seiki Seisaku-sho, Ltd.) and performing a weathering test under the following conditions for 2,000 hours. Thereafter, the cured film was similarly measured for a contact angle with water (water repellency) as an index of weather resistance. The results (contact angle with water after weathering test) are shown in Table 2.

light source: xenon lamp
   irradiance: 60 W/m$^2$ (300-400 nm)

[Evaluation of Alkali Resistance]

The glass sample with the cured film, prepared above, was tested by diluting a sodium hydroxide solution with water to form an alkaline aqueous solution having a concentration of 0.4 wt %, dipping the sample therein for 4 hours, and measuring a contact angle with water. The measurement of a contact angle with water was the same as above. The results (contact angle with water after alkali resistance test) are shown in Table 2.

TABLE 2

|  |  | Initial contact angle with water (°) | Contact angle with water after abrasion (°) | Contact angle with water after weathering test (°) | Contact angle with water after alkali resistance test (°) |
|---|---|---|---|---|---|
| Example | 1 | 112 | 105 | 105 | 105 |
|  | 2 | 113 | 110 | 110 | 108 |
|  | 3 | 115 | 110 | 108 | 113 |
|  | 4 | 114 | 107 | 103 | 113 |
| Comparative Example | 1 | 111 | <90 | 105 | <90 |
|  | 2 | 111 | <80 | 105 | <70 |
|  | 3 | 115 | 110 | <100 | 113 |
|  | 4 | 110 | <100 | 110 | <100 |
|  | 5 | 111 | <100 | 109 | 110 |

The surface treating agents of Examples 1 to 4 met both durability performance and weathering resistance performance because (A) the fluorooxyalkylene-containing polymer-modified, hydrolyzable group-containing silane compound, the fluorooxyalkylene-containing polymer residue having a specific Mn, was mixed with (B) the polysilazane compound composed of fluorooxyalkylene-containing polymer-modified silazane units, the fluorooxyalkylene-containing polymer residue having a specific Mn, in the specific ratio. It is demonstrated that the agents exhibit excellent performance in any of the tests as long as the molecular weight and mixing ratio of components (A) and (B) are within the ranges of the invention.

The invention claimed is:

1. A fluorinated coating composition comprising
   (A) one or more compounds selected from hydroxyl or hydrolyzable group-containing silanes and siloxanes which are modified with a fluorooxyalkylene-containing polymer, and partial (hydrolytic) condensates thereof, the fluorooxyalkylene-containing polymer residue in component (A) having a number average molecular weight of 1,500 to 10,000, and
   (B) a fluorooxyalkylene-containing polymer-modified polysilazane composed of fluorooxyalkylene-containing polymer-modified silazane units, the fluorooxyalkylene-containing polymer residue in the fluorooxyalkylene-containing polymer-modified silazane units as component (B) having a number average molecular weight of 500 to 6,000, wherein
   component (A) and component (B) are mixed in a weight ratio of from 10:90 to 90:10, provided that the total weight of components (A) and (B) is 100.

2. The fluorinated coating composition of claim 1 wherein component (A) is one or more compounds selected from fluorooxyalkylene-containing polymer-modified, hydroxyl or hydrolyzable group-containing silanes and siloxanes, represented by the general formula (1) or (2), and partial (hydrolytic) condensates thereof,

$$\text{Rf-}[A(V)_\beta]_\alpha \quad (1)$$

wherein Rf is a mono- or divalent fluorooxyalkylene-containing polymer residue, A is independently a di- to decavalent organic group which may contain an oxygen, silicon or nitrogen atom and which may be fluorinated, V is independently a monovalent group containing a silyl group terminated with a hydroxyl or hydrolyzable group, α is 1 or 2, β is an integer of 1 to 9,

$$\text{Rf-}[Q\text{-}(G)_\delta\text{-}B]_\alpha \quad (2)$$

wherein Rf and α are as defined above, Q is independently a single bond or a divalent organic group which may contain an oxygen, silicon or nitrogen atom, G is independently a divalent organic group which contains a silyl group having a hydroxyl or hydrolyzable group and may contain an oxygen atom, B is independently hydrogen, C$_1$-C$_4$ alkyl group or halogen, δ is an integer of 1 to 10, and component (B) is a fluorooxyalkylene-containing polymer-modified polysilazane composed of fluorooxyalkylene-containing polymer-modified silazane units, represented by the general formula (3):

$$\text{Rf-}[A'\text{-}Si(NH)_{1.5}]_\alpha \quad (3)$$

wherein Rf and α are as defined above, A' is independently a divalent organic group which may contain an oxygen, silicon or nitrogen atom and which may be fluorinated.

3. The fluorinated coating composition of claim 1 wherein component (A) is one or more compounds selected from fluorooxyalkylene-containing polymer-modified, hydroxyl or hydrolyzable group-containing silanes and siloxanes, represented by the general formula (4) or (5), and partial (hydrolytic) condensates thereof,

[Chem. 1]

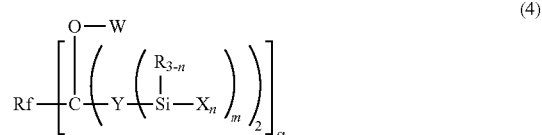

$$\text{Rf}\left[\begin{array}{c}\text{O-W}\\\text{C}\left(\text{Y}\left(\begin{array}{c}R_{3-n}\\|\\\text{Si}\end{array}\text{-X}_n\right)_m\right)_2\end{array}\right]_\alpha \quad (4)$$

wherein Rf is a mono- or divalent fluorooxyalkylene-containing polymer residue, Y is independently a di- to hexavalent organic group which may contain one or more moieties selected from silicon, siloxane bond, silalkylene structure and silarylene structure, R is independently a $C_1$-$C_4$ alkyl group or phenyl group, X is independently a hydroxyl or hydrolizable group, n is an integer of 1 to 3, m is an integer of 1 to 5, W is independently hydrogen or a group having the formula (4a) or (4b):

[Chem. 2]

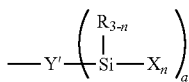

(4a)

wherein R, X and n are as defined above, Y' is a di- to hexavalent organic group which may contain silicon and/or siloxane bond, a is an integer of 1 to 5,

[Chem. 3]

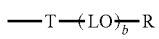

(4b)

wherein R is as defined above, T is a single bond, divalent siloxane bond or silylene group, L is independently a $C_1$-$C_4$ alkylene group, and b is an integer of 1 to 20, α is 1 or 2,

[Chem. 4]

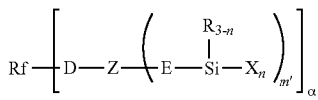

(5)

wherein Rf, X, R, n and α are as defined above, D is independently a single bond or a divalent organic group which may contain ether bond and/or silicon and which may be fluorinated, Z is independently a single bond, or a group selected from trivalent group of the formula: —C(J)= (wherein J is an alkyl group, hydroxyl group or silyl ether group of the formula: $K_3SiO$— wherein K is independently hydrogen, alkyl, aryl or alkoxy), trivalent group of the formula: —Si(L')= (wherein L' is alkyl), tetravalent group of the formula: —C≡, tetravalent group of the formula: —Si≡, and di- to octavalent siloxane residues, E is independently a $C_1$-$C_5$ alkylene group which may contain one or more moieties selected from oxygen, diorganosilylene group and diorganosiloxane structure, and m' is an integer of 1 to 7.

4. The fluorinated coating composition of claim 2 wherein in formulae (1) to (5), α=1, and Rf is a monovalent fluorooxyalkylene-containing polymer residue having the general formula (6):

[Chem. 5]

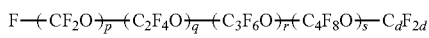

(6)

wherein p, q, r and s each are an integer of 0 to 200, p+q+r+s is 3 to 200, each of the repeating units may be linear or branched, the repeating units may be randomly arranged, d is an integer of 1 to 3, the unit with d may be linear or branched.

5. The fluorinated coating composition of claim 4 wherein in formulae (1) to (5), α=1, and Rf is a monovalent fluorooxyalkylene-containing polymer residue having the general formula (7a) or (7b):

[Chem. 6]

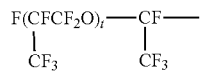

(7a)

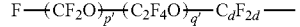

(7b)

wherein t is an integer of at least 3, p' and q' each are an integer of 1 to 199, p'+q' is 3 to 200, each of the repeating units may be linear or branched, the repeating units may be randomly arranged, d is an integer of 1 to 3, the unit with d may be linear or branched.

6. The fluorinated coating composition of claim 2 wherein in formulae (1) to (5), α=2, and Rf is a divalent fluorooxyalkylene-containing polymer residue having the general formula (8):

[Chem. 7]

(8)

wherein p, q, r and s each are an integer of 0 to 200, p+q+r+s is 3 to 200, each of the repeating units may be linear or branched, the repeating units may be randomly arranged, d is an integer of 1 to 3, the unit with d may be linear or branched.

7. The fluorinated coating composition of claim 6 wherein in formulae (1) to (5), α=2, and Rf is a divalent fluorooxyalkylene-containing polymer residue having the general formula (9a) or (9b):

[Chem. 8]

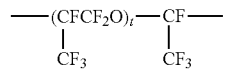

(9a)

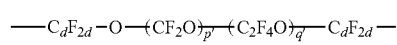

(9b)

wherein t is an integer of at least 3, p' and q' each are an integer of 1 to 199, p'+q' is 3 to 200, each of the repeating units may be linear or branched, the repeating units may be randomly arranged, d is an integer of 1 to 3, the unit with d may be linear or branched.

8. The fluorinated coating composition of claim 1 wherein the number average molecular weight of the fluorooxyalkylene-containing polymer residue in component (A) is greater than the number average molecular weight of the fluorooxyalkylene-containing polymer residue in the fluorooxyalkylene-containing polymer-modified silazane unit as component (B).

9. The fluorinated coating composition of claim 3 wherein in formula (4), Y is a group selected from a $C_3$-$C_{10}$ alkylene group, a $C_6$-$C_8$ arylene-containing alkylene group, a divalent group having alkylene groups bonded via a silalkylene or silarylene structure, and a di- to tetravalent group having a $C_2$-$C_{10}$ alkylene group bonded to a valence bond of a di- to tetravalent linear organopolysiloxane residue of 2 to 10 silicon atoms or di- to tetravalent branched or cyclic organopolysiloxane residue of 3 to 10 silicon atoms.

10. The fluorinated coating composition of claim 3 wherein in formula (4a), Y' is a group selected from a $C_2$-$C_{10}$ alkylene group, a $C_6$-$C_8$ arylene-containing alkylene group, a $C_2$-$C_6$ diorganosilylene-containing alkylene group, a divalent group having alkylene groups bonded via a silalkylene or silarylene structure, and a di- to tetravalent group having a $C_2$-$C_{10}$ alkylene group bonded to a valence bond of a di- to tetravalent linear organopolysiloxane residue of 2 to 10 silicon atoms or di- to tetravalent branched or cyclic organopolysiloxane residue of 3 to 10 silicon atoms.

11. The fluorinated coating composition of claim 3 wherein in formulae (4), (4a) and (5), each X is selected from a hydroxyl group, $C_1$-$C_{10}$ alkoxy group, $C_2$-$C_{10}$ alkoxyalkoxy group, $C_1$-$C_{10}$ acyloxy group, $C_2$-$C_{10}$ alkenyloxy group, and halogen.

12. A surface treating agent comprising the fluorinated coating composition of claim 1.

13. A cured film comprising the surface treating agent of claim 12 in the cured state.

14. An article having on its surface the cured film of the surface treating agent of claim 13.

* * * * *